US012621661B2

(12) United States Patent　　(10) Patent No.:　US 12,621,661 B2
Elshafie et al.　　　　　　　　　(45) Date of Patent:　May 5, 2026

(54) CHANNEL FOR EAVESDROPPING-MITIGATION AND SECRET KEY GENERATION

(71) Applicant: QUALCOMM Incorporated, San Diego, CA (US)

(72) Inventors: Ahmed Elshafie, San Diego, CA (US); Alexandros Manolakos, Athens (GR)

(73) Assignee: QUALCOMM Incorporated, San Diego, CA (US)

( * ) Notice: Subject to any disclaimer, the term of this patent is extended or adjusted under 35 U.S.C. 154(b) by 68 days.

(21) Appl. No.: 18/292,711

(22) PCT Filed: Sep. 9, 2022

(86) PCT No.: PCT/US2022/076170
§ 371 (c)(1),
(2) Date: Jan. 26, 2024

(87) PCT Pub. No.: WO2023/056165
PCT Pub. Date: Apr. 6, 2023

(65) Prior Publication Data
US 2024/0373214 A1　　Nov. 7, 2024

(30) Foreign Application Priority Data

Oct. 1, 2021　(GR) .............................. 20210100656

(51) Int. Cl.
H04L 25/02　　　(2006.01)
H04L 9/00　　　(2022.01)
(Continued)

(52) U.S. Cl.
CPC ......... H04W 12/041 (2021.01); H04L 9/0838 (2013.01); H04L 25/0224 (2013.01)

(58) Field of Classification Search
CPC ... H04L 9/0838; H04L 25/0224; H04L 9/001; H04W 12/041
See application file for complete search history.

(56) References Cited

U.S. PATENT DOCUMENTS 10,405,299 B2 * 9/2019 Rico Alvarino .... H04W 72/542
10,567,134 B1 * 2/2020 Schelstraete ......... H04B 7/0486
(Continued)

FOREIGN PATENT DOCUMENTS

CN　　111769919 A * 10/2020 ......... H04L 25/0224
WO　WO-2015023233 A1　2/2015
(Continued)

OTHER PUBLICATIONS

International Search Report and Written Opinion—PCT/US2022/076170—ISA/EPO—Dec. 15, 2022 (2103989WO).
(Continued)

*Primary Examiner* — Andrew Suh
(74) *Attorney, Agent, or Firm* — Holland & Hart LLP /Qualcomm

(57) ABSTRACT

Methods, systems, and devices for wireless communications are described. The described techniques provide for securing communications in a wireless communications system. A base station may determine a value that one or more user equipments (UEs) are to use for deriving a secret key for use in securing communications. A UE may use a security key generation procedure to determine the value and derive the key. According to the security key generation procedure, the UE may transmit a sounding reference signal using a first antenna of a plurality of antennas configured at the UE. The UE may then select and use the first antenna for receiving a downlink reference signal in accordance with the security key generation procedure. The UE may derive a security key using a value associated with the downlink reference signal (Continued)

and communicate with the base station via communications that are secured using the derived security key.

30 Claims, 16 Drawing Sheets

(51) Int. Cl.
  H04L 9/08    (2006.01)
  H04W 12/041  (2021.01)

(56) References Cited

U.S. PATENT DOCUMENTS

| | | | | |
|---|---|---|---|---|
| 11,627,632 | B2 * | 4/2023 | Kim | H04W 76/27 |
| | | | | 370/329 |
| 2008/0069251 | A1 * | 3/2008 | Imai | H04L 9/0875 |
| | | | | 375/260 |
| 2024/0372672 | A1 | 11/2024 | Elshafie et al. | |

FOREIGN PATENT DOCUMENTS

| | | | | | |
|---|---|---|---|---|---|
| WO | WO-2021013317 | A1 * | 1/2021 | | H04L 9/0875 |
| WO | WO-2021061352 | A1 | 4/2021 | | |

OTHER PUBLICATIONS

International Search Report and Written Opinion—PCT/US2022/079974—ISA/EPO—Mar. 14, 2023 (2105413WO).

Melki R., et al., "Physical Layer Security Schemes for MIMO Systems: an Overview", Wireless Networks, ACM, 2 Penn Plaza, Suite 701—New York USA, vol. 26, No. 3, Jun. 14, 2019, pp. 2089-2111, XP037059649, 23 Pages, Retrieved on Jun. 14, 2019, p. 2089-p. 2098.

Taha H., et al., "Secret Key Exchange Using Private Random Precoding in MIMO FDD and TDD Systems", IEEE Transactions on Vehicular Technology, IEEE, USA, Vol. 66, No. 6, Jun. 1, 2017, pp. 4823-4833, XP011653962, ISSN: 0018-9545, DOI: 10.1109/TVT.2016.2611565, Figure 4, paragraphs [II .A], [II.C], [III .A], [III. C].

Thai C. D. T., et al., "Secret Group-Key Generation at Physical Layer for Multi-Antenna Mesh Topology", IEEE Transactions on Information Forensics and Security, IEEE, USA, vol. 14, No. 1, Jan. 1, 2019, pp. 18-33, XP011687036, 39 Pages, Retrieved on Jul. 12, 2018, p. 18-p. 23.

* cited by examiner

335 〜 [shaded box]  Resource Block

340 〜 [empty box]  Resource Element

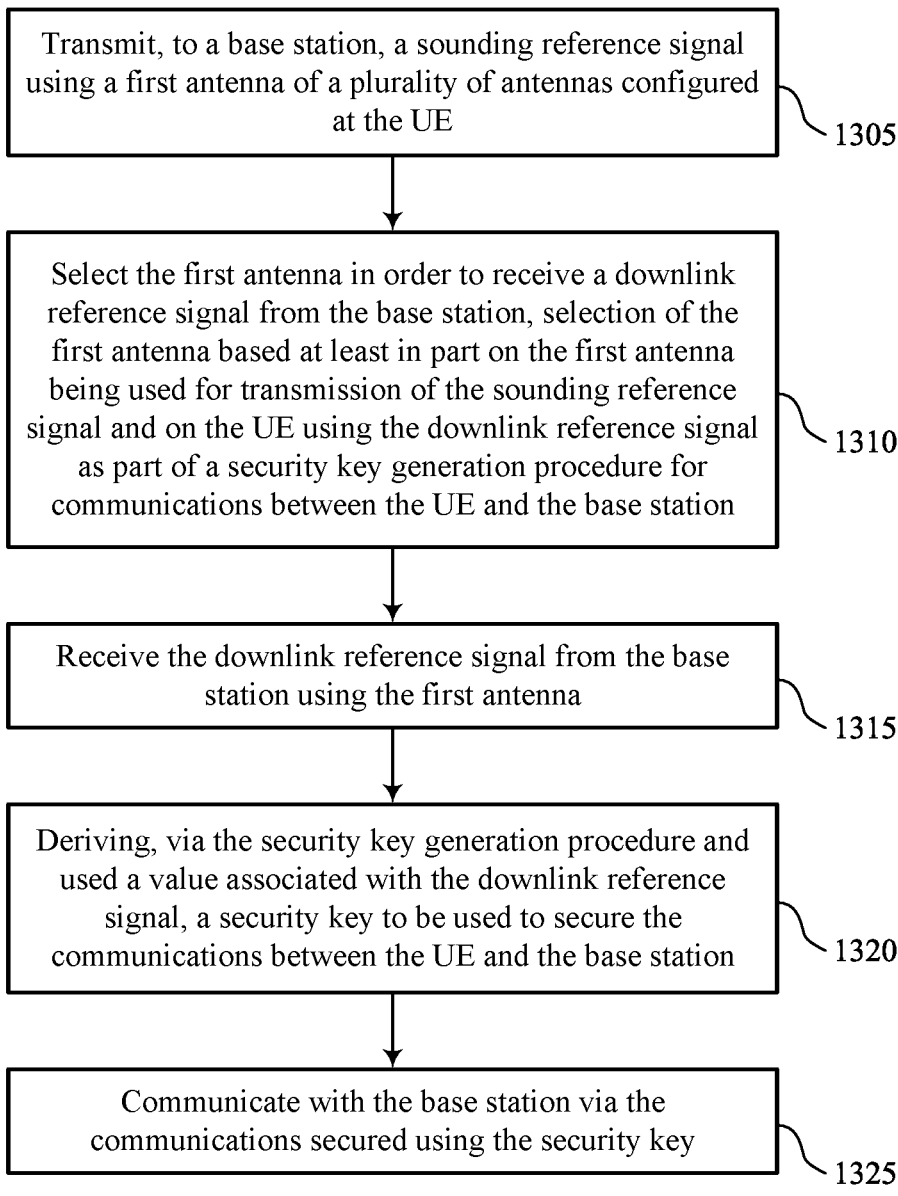

Transmit, to a base station, a sounding reference signal using a first antenna of a plurality of antennas configured at the UE

1305

Select the first antenna in order to receive a downlink reference signal from the base station, selection of the first antenna based at least in part on the first antenna being used for transmission of the sounding reference signal and on the UE using the downlink reference signal as part of a security key generation procedure for communications between the UE and the base station

1310

Receive the downlink reference signal from the base station using the first antenna

1315

Deriving, via the security key generation procedure and used a value associated with the downlink reference signal, a security key to be used to secure the communications between the UE and the base station

1320

Communicate with the base station via the communications secured using the security key

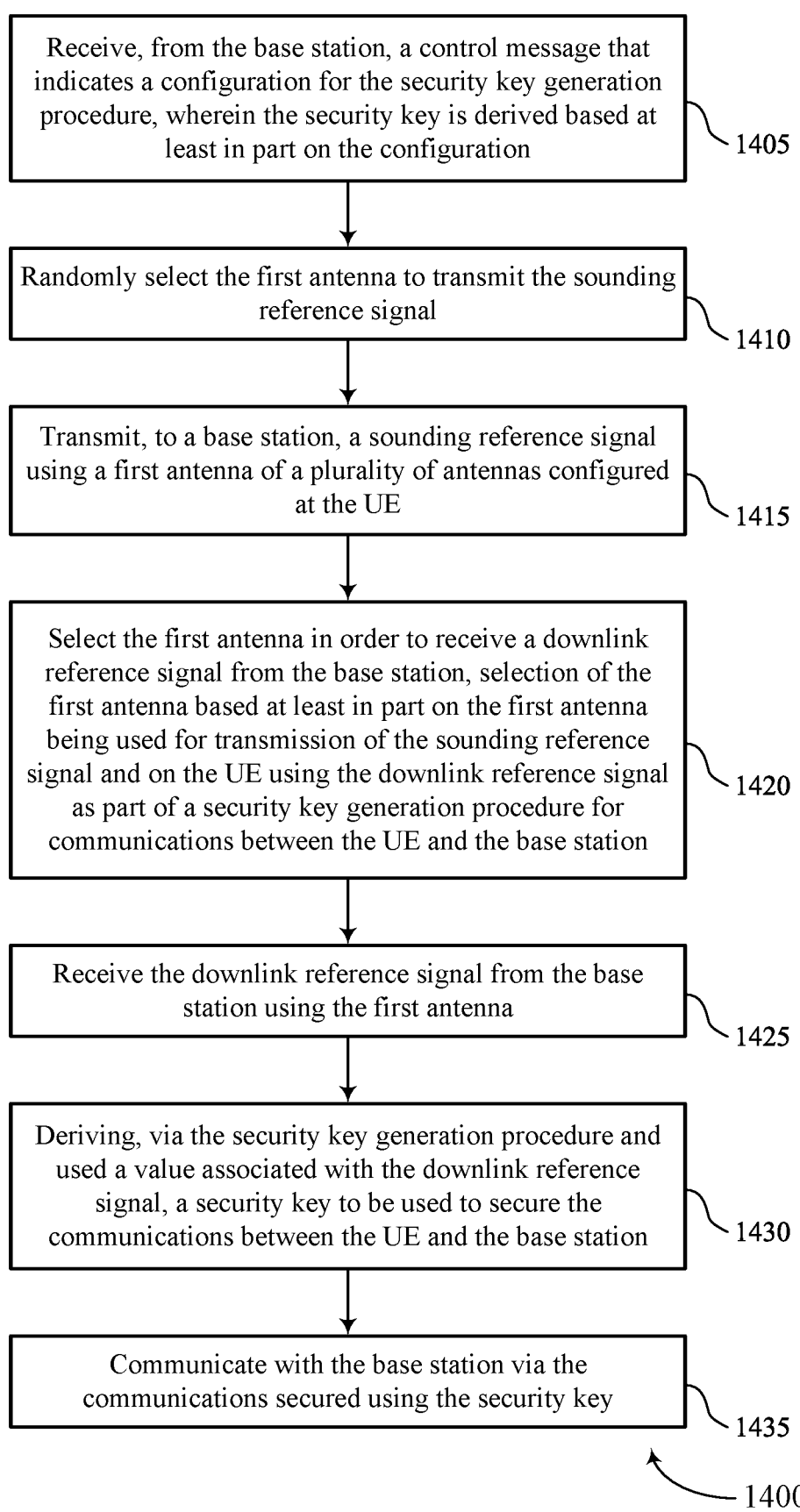

Receive, from the base station, a control message that indicates a configuration for the security key generation procedure, wherein the security key is derived based at least in part on the configuration

1405

Randomly select the first antenna to transmit the sounding reference signal

1410

Transmit, to a base station, a sounding reference signal using a first antenna of a plurality of antennas configured at the UE

1415

Select the first antenna in order to receive a downlink reference signal from the base station, selection of the first antenna based at least in part on the first antenna being used for transmission of the sounding reference signal and on the UE using the downlink reference signal as part of a security key generation procedure for communications between the UE and the base station

1420

Receive the downlink reference signal from the base station using the first antenna

1425

Deriving, via the security key generation procedure and used a value associated with the downlink reference signal, a security key to be used to secure the communications between the UE and the base station

1430

Communicate with the base station via the communications secured using the security key

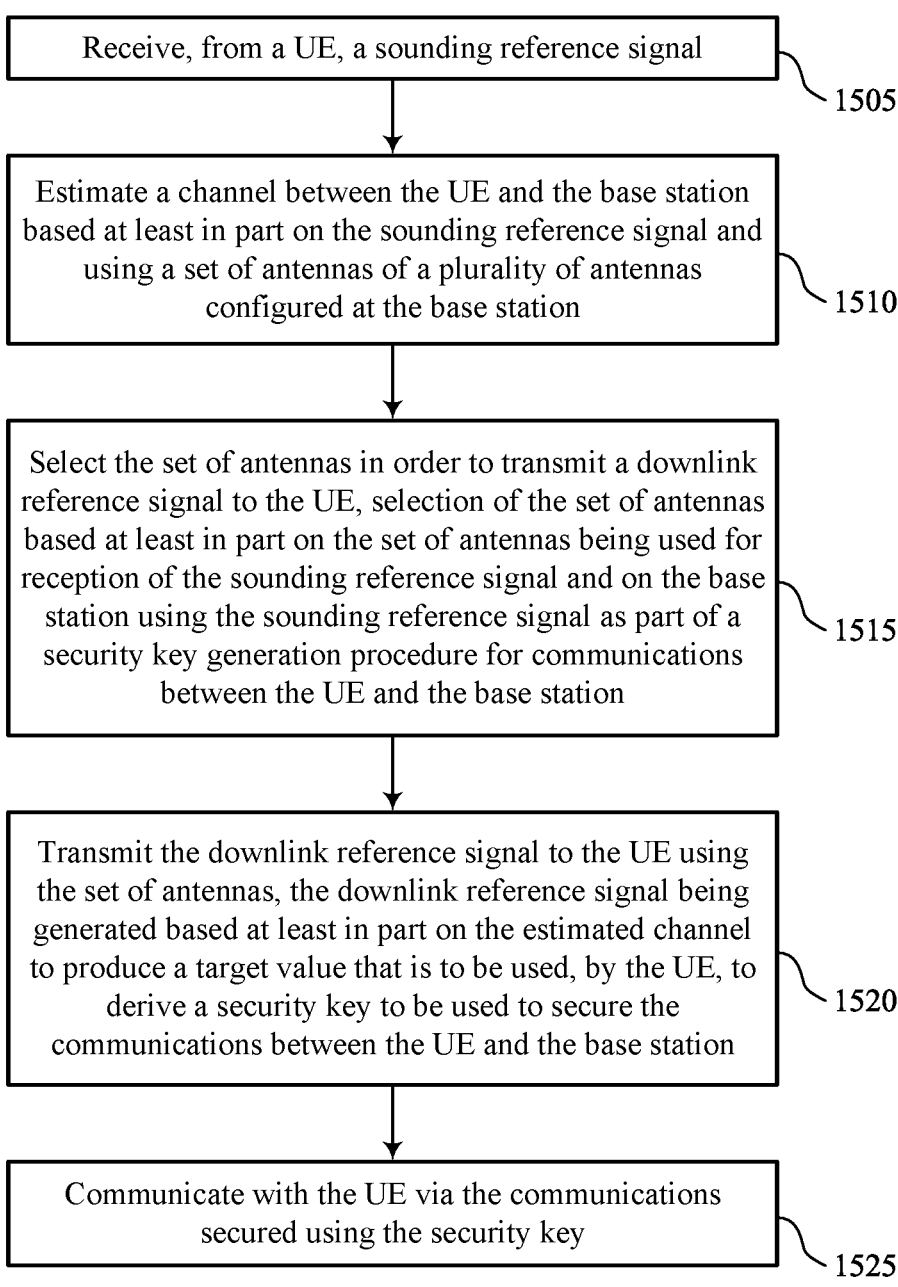

Receive, from a UE, a sounding reference signal

1505

Estimate a channel between the UE and the base station based at least in part on the sounding reference signal and using a set of antennas of a plurality of antennas configured at the base station

1510

Select the set of antennas in order to transmit a downlink reference signal to the UE, selection of the set of antennas based at least in part on the set of antennas being used for reception of the sounding reference signal and on the base station using the sounding reference signal as part of a security key generation procedure for communications between the UE and the base station

1515

Transmit the downlink reference signal to the UE using the set of antennas, the downlink reference signal being generated based at least in part on the estimated channel to produce a target value that is to be used, by the UE, to derive a security key to be used to secure the communications between the UE and the base station

1520

Communicate with the UE via the communications secured using the security key

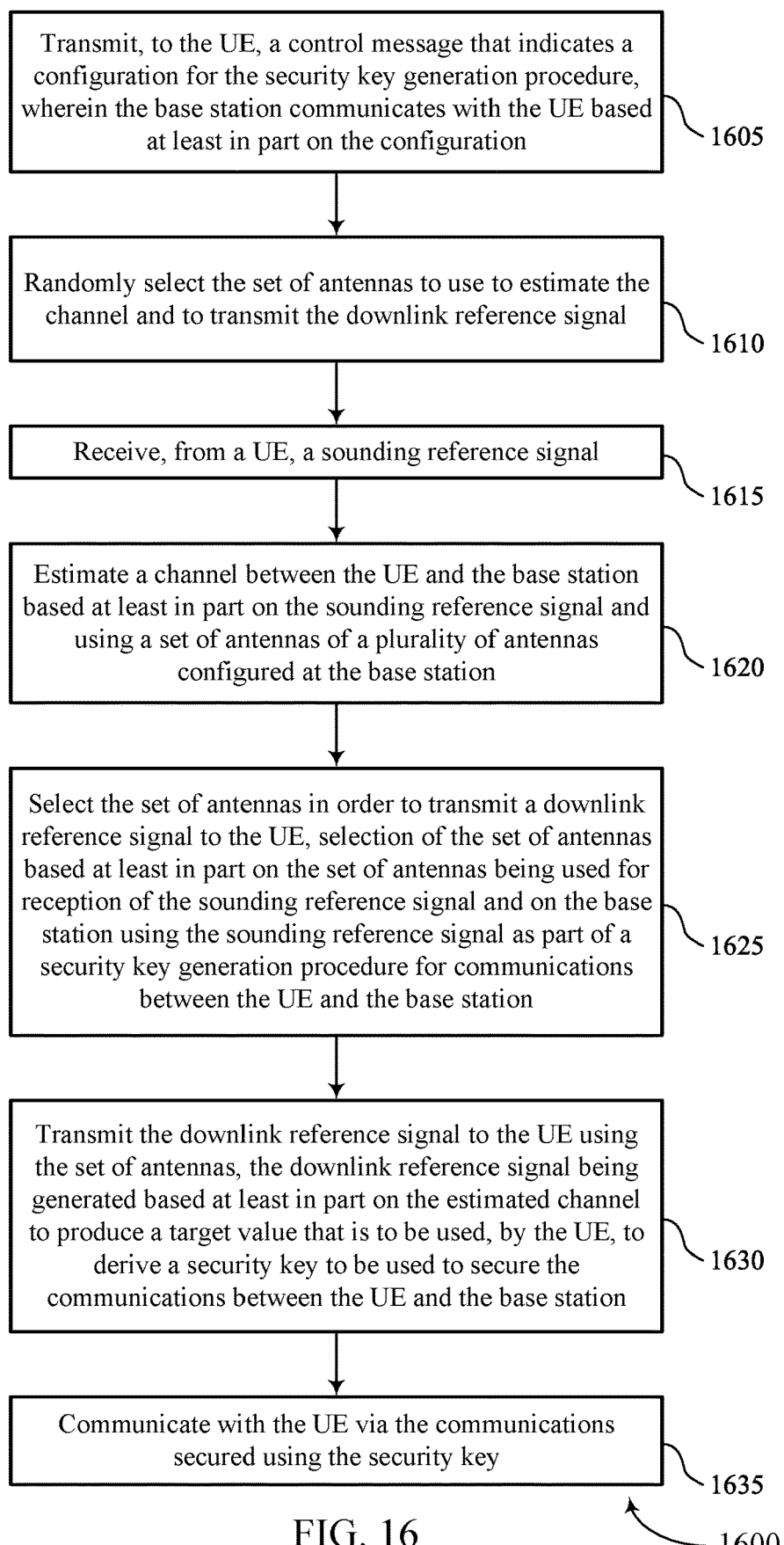

Transmit, to the UE, a control message that indicates a configuration for the security key generation procedure, wherein the base station communicates with the UE based at least in part on the configuration ⌇ 1605

Randomly select the set of antennas to use to estimate the channel and to transmit the downlink reference signal ⌇ 1610

Receive, from a UE, a sounding reference signal ⌇ 1615

Estimate a channel between the UE and the base station based at least in part on the sounding reference signal and using a set of antennas of a plurality of antennas configured at the base station ⌇ 1620

Select the set of antennas in order to transmit a downlink reference signal to the UE, selection of the set of antennas based at least in part on the set of antennas being used for reception of the sounding reference signal and on the base station using the sounding reference signal as part of a security key generation procedure for communications between the UE and the base station ⌇ 1625

Transmit the downlink reference signal to the UE using the set of antennas, the downlink reference signal being generated based at least in part on the estimated channel to produce a target value that is to be used, by the UE, to derive a security key to be used to secure the communications between the UE and the base station ⌇ 1630

Communicate with the UE via the communications secured using the security key ⌇ 1635

FIG. 16          ⌇ 1600

CHANNEL FOR EAVESDROPPING-MITIGATION AND SECRET KEY GENERATION

CROSS REFERENCE

The present Application is a 371 national stage filing of International PCT Application No. PCT/US2022/076170 by ELSHAFIE et al. entitled "CHANNEL FOR EAVESDROPPING-MITIGATION AND SECRET KEY GENERATION," filed Sep. 9, 2022; and claims priority to Greece patent application No. 20210100656 by ELSHAFIE et al., entitled "CHANNEL FOR EAVESDROPPING-MITIGATION AND SECRET KEY GENERATION," filed Oct. 1, 2021, each of which is assigned to the assignee hereof, and each of which is expressly incorporated by reference in its entirety herein.

FIELD OF TECHNOLOGY

The following relates to wireless communications, including channel for eavesdropping-mitigation and secret key generation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may implement security schemes to secure or encrypt communications between devices, such as communications between a base station and a UE. In some examples, the devices may use a security key to secure such communications. These techniques may be used to reduce or limit the ability for other devices, such as other UEs, to eavesdrop on communications and identify data intended to be secure.

SUMMARY

The described techniques relate to improved methods, systems, devices, and apparatuses that support channel for eavesdropping-mitigation and secret key generation. Generally, the described techniques provide for securing communications in a wireless communications system. A base station may determine a value that one or more user equipments (UEs) are to use for deriving a secret key (e.g., a security key) for use in securing communications. A UE may use a security key generation procedure to determine the value and derive the key. According to the security key generation procedure, the UE may transmit a sounding reference signal using a first antenna of a plurality of antennas configured at the UE. The UE may then select and use the first antenna for receiving a downlink reference signal in accordance with the security key generation procedure. The UE may derive a security key using a value associated with the downlink reference signal (e.g., the value determined by the base station) and communicate with the base station via communications that are secured using the derived security key.

A method for wireless communication at a user equipment (UE) is described. The method may include transmitting, to a base station, a sounding reference signal using a first antenna of a set of multiple antennas configured at the UE, selecting the first antenna in order to receive a downlink reference signal from the base station, selection of the first antenna based on the first antenna being used for transmission of the sounding reference signal and on the UE using the downlink reference signal as part of a security key generation procedure for communications between the UE and the base station, receiving the downlink reference signal from the base station using the first antenna, deriving, via the security key generation procedure and using a value associated with the downlink reference signal, a security key to be used to secure the communications between the UE and the base station, and communicating with the base station via the communications secured using the security key.

A UE for wireless communications is described. The UE may include a processor, memory coupled with the processor, and instructions stored in the memory. The instructions may be executable by the processor to cause the UE to transmit, to a base station, a sounding reference signal using a first antenna of a set of multiple antennas configured at the UE, select the first antenna in order to receive a downlink reference signal from the base station, selection of the first antenna based on the first antenna being used for transmission of the sounding reference signal and on the UE using the downlink reference signal as part of a security key generation procedure for communications between the UE and the base station, receive the downlink reference signal from the base station using the first antenna, derive, via the security key generation procedure and using a value associated with the downlink reference signal, a security key to be used to secure the communications between the UE and the base station, and communicate with the base station via the communications secured using the security key.

Another UE for wireless communication is described. The UE may include means for transmitting, to a base station, a sounding reference signal using a first antenna of a set of multiple antennas configured at the UE, means for selecting the first antenna in order to receive a downlink reference signal from the base station, selection of the first antenna based on the first antenna being used for transmission of the sounding reference signal and on the UE using the downlink reference signal as part of a security key generation procedure for communications between the UE and the base station, means for receiving the downlink reference signal from the base station using the first antenna, means for deriving, via the security key generation procedure and using a value associated with the downlink reference signal, a security key to be used to secure the communications between the UE and the base station, and means for communicating with the base station via the communications secured using the security key.

A non-transitory computer-readable medium storing code for wireless communication at a UE is described. The code may include instructions executable by a processor to transmit, to a base station, a sounding reference signal using a first antenna of a set of multiple antennas configured at the UE, select the first antenna in order to receive a downlink reference signal from the base station, selection of the first antenna based on the first antenna being used for transmission of the sounding reference signal and on the UE using the downlink reference signal as part of a security key generation procedure for communications between the UE and the base station, receive the downlink reference signal from the base station using the first antenna, derive, via the security key generation procedure and using a value associated with the downlink reference signal, a security key to be used to secure the communications between the UE and the base station, and communicate with the base station via the communications secured using the security key.

Some examples of the method, UEs, and non-transitory computer-readable medium described herein may further include operations, features, means, or instructions for receiving, from the base station, a control message that indicates a configuration for the security key generation procedure, where the security key may be derived based on the configuration.

In some examples of the method, UEs, and non-transitory computer-readable medium described herein, receiving the control message may include operations, features, means, or instructions for receiving the control message that indicates a set of quantization levels associated with the downlink reference signal, where the UE uses a quantized value of the downlink reference signal and a quantization level of the set of quantization levels to derive the security key.

In some examples of the method, UEs, and non-transitory computer-readable medium described herein, receiving the control message may include operations, features, means, or instructions for receiving the control message that indicates that the UE is to use a complex value derive the security key, where the complex value is use a quadrature amplitude modulation (QAM) point and is associated with the downlink reference signal may be used to derive the security key.

In some examples of the method, UEs, and non-transitory computer-readable medium described herein, receiving the control message may include operations, features, means, or instructions for receiving the control message that indicates an initialization time associated with derivation of the security key, where the sounding reference signal may be transmitted in accordance with the initialization time.

In some examples of the method, UEs, and non-transitory computer-readable medium described herein, receiving the control message may include operations, features, means, or instructions for receiving a radio resource control message, a medium access control layer control element message, or a downlink control information message.

Some examples of the method, UEs, and non-transitory computer-readable medium described herein may further include operations, features, means, or instructions for determining a quantized version of the value associated with the downlink reference signal in accordance with the security key generation procedure and inputting the quantized version of the value into a key derivation function to derive the security key.

Some examples of the method, UEs, and non-transitory computer-readable medium described herein may further include operations, features, means, or instructions for determining the value using quadrature amplitude modulation (QAM) point in accordance with the security key generation procedure and inputting the value into a key derivation function to derive the security key.

Some examples of the method, UEs, and non-transitory computer-readable medium described herein may further include operations, features, means, or instructions for determining the value associated with the downlink reference signal by estimating a channel associated with the downlink reference signal.

Some examples of the method, UEs, and non-transitory computer-readable medium described herein may further include operations, features, means, or instructions for receiving, from the base station, a second downlink reference signal using a second resource and deriving a second security key to be used to secure subsequent communications between the UE and the base station, where the UE communicates with the base station based on the second security key.

In some examples of the method, UEs, and non-transitory computer-readable medium described herein, randomly selecting the first antenna to transmit the sounding reference signal.

In some examples of the method, UEs, and non-transitory computer-readable medium described herein, receiving the downlink reference signal may include operations, features, means, or instructions for receiving a channel state information reference signal.

In some examples of the method, UEs, and non-transitory computer-readable medium described herein, receiving the downlink reference signal may include operations, features, means, or instructions for receiving the downlink reference signal that may be precoded with random parameters.

In some examples of the method, UEs, and non-transitory computer-readable medium described herein, communicating with the base station may include operations, features, means, or instructions for encoding information bits of an uplink message using the security key and transmitting, to the base station, the encoded uplink message.

A method for wireless communications at a base station is described. The method may include receiving, from a UE, a sounding reference signal, estimating a channel between the UE and the base station based on the sounding reference signal and using a set of antennas of a set of multiple antennas configured at the base station, selecting the set of antennas in order to transmit a downlink reference signal to the UE, selection of the set of antennas based on the set of antennas being used for reception of the sounding reference signal and on the base station using the sounding reference signal as part of a security key generation procedure for communications between the UE and the base station, transmitting the downlink reference signal to the UE using the set of antennas, the downlink reference signal being generated based on the estimated channel to produce a target value that is to be used, by the UE, to derive a security key to be used to secure the communications between the UE and the base station, and communicating with the UE via the communications secured using the security key.

A base station for wireless communications is described. The base station may include a processor, memory coupled with the processor, and instructions stored in the memory. The instructions may be executable by the processor to cause the base station to receive, from a UE, a sounding reference signal, estimate a channel between the UE and the base station based on the sounding reference signal and using a set of antennas of a set of multiple antennas configured at the base station, select the set of antennas in order to transmit a downlink reference signal to the UE, selection of the set of antennas based on the set of antennas being used for reception of the sounding reference signal and on the base station using the sounding reference signal as part of a security key generation procedure for communications between the UE and the base station, transmit the downlink reference signal to the UE using the set of antennas, the downlink reference signal being generated based on the estimated channel to produce a target value that is to be used, by the UE, to derive a security key to be used to secure the communications between the UE and the base station, and communicate with the UE via the communications secured using the security key.

Another base station for wireless communications is described. The base station may include means for receiving, from a UE, a sounding reference signal, means for estimating a channel between the UE and the base station based on the sounding reference signal and using a set of antennas of a set of multiple antennas configured at the base station, means for selecting the set of antennas in order to transmit a downlink reference signal to the UE, selection of the set of antennas based on the set of antennas being used for reception of the sounding reference signal and on the base station using the sounding reference signal as part of a security key generation procedure for communications between the UE and the base station, means for transmitting the downlink reference signal to the UE using the set of antennas, the downlink reference signal being generated based on the estimated channel to produce a target value that is to be used, by the UE, to derive a security key to be used to secure the communications between the UE and the base station, and means for communicating with the UE via the communications secured using the security key.

A non-transitory computer-readable medium storing code for wireless communications at a base station is described. The code may include instructions executable by a processor to receive, from a UE, a sounding reference signal, estimate a channel between the UE and the base station based on the sounding reference signal and using a set of antennas of a set of multiple antennas configured at the base station, select the set of antennas in order to transmit a downlink reference signal to the UE, selection of the set of antennas based on the set of antennas being used for reception of the sounding reference signal and on the base station using the sounding reference signal as part of a security key generation procedure for communications between the UE and the base station, transmit the downlink reference signal to the UE using the set of antennas, the downlink reference signal being generated based on the estimated channel to produce a target value that is to be used, by the UE, to derive a security key to be used to secure the communications between the UE and the base station, and communicate with the UE via the communications secured using the security key.

Some examples of the method, base stations, and non-transitory computer-readable medium described herein may further include operations, features, means, or instructions for transmitting, to the UE, a control message that indicates a configuration for the security key generation procedure, where the base station communicates with the UE based on the configuration.

In some examples of the method, base stations, and non-transitory computer-readable medium described herein, transmitting the control message may include operations, features, means, or instructions for transmitting the control message that indicates a set of quantization levels associated with the downlink reference signal, where a quantized value of the downlink reference signal and a quantization level of the set of quantization levels to derive the security key.

In some examples of the method, base stations, and non-transitory computer-readable medium described herein, transmitting the control message may include operations, features, means, or instructions for transmitting the control message that indicates that the UE is to use a complex value to derive the security key, where the complex value is a QAM point and is associated with the downlink reference signal may be used to derive the security key.

In some examples of the method, base stations, and non-transitory computer-readable medium described herein, transmitting the control message may include operations, features, means, or instructions for transmitting the control message that indicates an initialization time associated with derivation of the security key, where the sounding reference signal may be received in accordance with the initialization time.

In some examples of the method, base stations, and non-transitory computer-readable medium described herein, transmitting the control message may include operations, features, means, or instructions for transmitting a radio resource control message, a medium access control layer control element message, or a downlink control information message.

Some examples of the method, base stations, and non-transitory computer-readable medium described herein may further include operations, features, means, or instructions for transmitting, to the UE, a second downlink reference signal using a second resource, where the second downlink reference signal may be used to derive a second security securing subsequent communications between the base station and the UE.

In some examples of the method, base stations, and non-transitory computer-readable medium described herein, randomly selecting the set of antennas to use to estimate the channel and to transmit the downlink reference signal.

Some examples of the method, base stations, and non-transitory computer-readable medium described herein may further include operations, features, means, or instructions for selecting the set of antennas based on a signal metric associated with the sounding reference signal for the set of multiple antennas configured at the base station.

In some examples of the method, base stations, and non-transitory computer-readable medium described herein, the signal metric may be a reference signal received power, a reference signal received quality, or a signal-to-interference-plus-noise ratio.

Some examples of the method, base stations, and non-transitory computer-readable medium described herein may further include operations, features, means, or instructions for selecting a precoding value for the downlink reference signal using the estimated channel such that the target value may be identified at the UE.

In some examples of the method, base stations, and non-transitory computer-readable medium described herein, randomly selecting a precoding value for the downlink reference signal and adding noise to the generated downlink reference signal using the estimated channel such that the target value may be identified at the UE.

In some examples of the method, base stations, and non-transitory computer-readable medium described herein, randomly selecting the precoding value may include operations, features, means, or instructions for generating a random vector of elements using a pseudo-random generator function.

In some examples of the method, base stations, and non-transitory computer-readable medium described herein, communicating with the UE may include operations, features, means, or instructions for encoding information bits of a downlink message using the security key and transmitting, to the UE, the downlink message.

BRIEF DESCRIPTION OF THE DRAWINGS

FIGS. 13 through 16 show flowcharts illustrating methods that support channel for eavesdropping-mitigation and secret key generation in accordance with aspects of the present disclosure.

DETAILED DESCRIPTION

Figure 1:
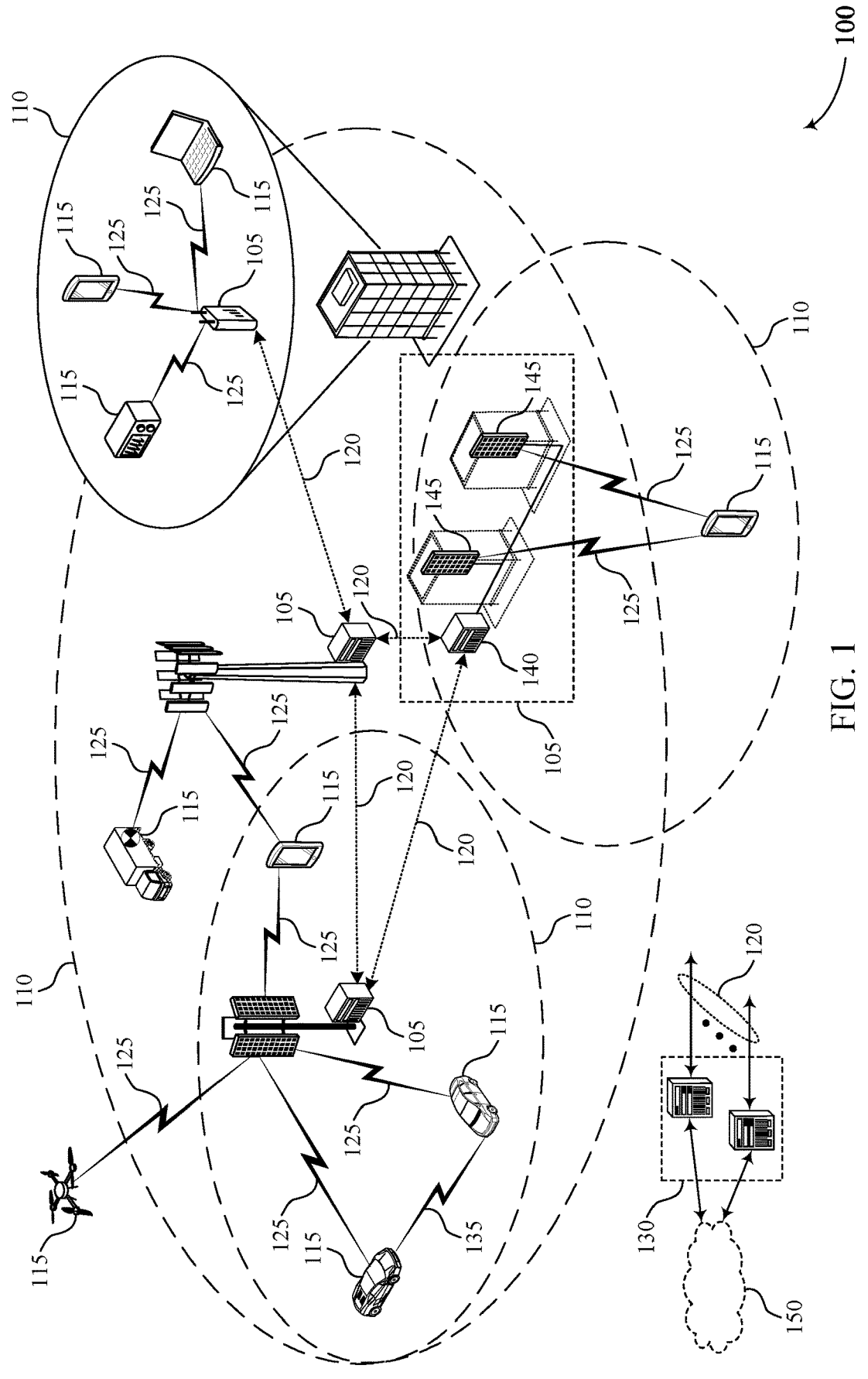
FIG. 1 illustrates an example of a wireless communications system that supports channel for eavesdropping-mitigation and secret key generation in accordance with aspects of the present disclosure.

Wireless communications systems may support techniques for securing communications. In some cases, secret keys may be used to encrypt or otherwise secure data in transmissions between devices of a wireless communications system. For example, a secret key may be used by a base station and a user equipment (UE) to secure some fields within a physical channel, such as information in a physical downlink control channel (PDCCH), a physical uplink control channel (PUCCH), physical downlink shared channel (PDSCH), or a physical uplink shared channel (PUSCH). According to some key extraction procedures, the UE and the base station may exchange reference signals and determine a channel metric based on the respective reference signals. The channel metric may be used as a seed to a key derivation function to determine a secret key. Because of channel reciprocity between the base station and the UE, each device may determine the same channel metric and thus derive the same secret key.

However, in such procedures, the UE and the base station alone may be able to derive the same key. Thus, these procedures may not be implemented in group common signals, where data transmissions are intended for multiple UEs or groups of UEs, because the UEs of the group may have different channel metrics.

Techniques described herein support secret key determination at the physical layer using channel reciprocity and channel estimation. Further, using these techniques, the channels transmitted by the base station may appear to be fast fading or random by other illegitimate receivers (e.g., other UEs). According to the techniques described herein, a UE may transmit a sounding reference signal (SRS) using a first antenna of a plurality of antennas configured at the UE. The base station may receive the reference signal and estimate a channel associated with the reference signal using a set of antennas of a plurality of antennas configured at the base station. The base station may then generate a downlink reference signal based on the estimated channel such that the downlink reference signal will result in a target value that is used to derive the secret key at the UE. As such, the UE may then use the first antenna to receive the downlink reference signal, such as a channel state information (CSI) reference signal (RS), based on the first antenna being used for transmitting the SRS and the UE using the downlink reference signal a part of a security key generation procedure for communications between the UE and the base station. The UE may estimate a channel associated with the CSI-RS to identify a value, such as a value associated with a preconfigured quadrature amplitude modulation (QAM) point), that is used to derive a secret key. As such, the UE may transmit the SRS and receive the downlink reference signal using the same antenna. Additionally, the base station may use the same set of antennas to estimate the channel and transmit the downlink reference signal. These techniques may result in the target value being identified at the UE and used to derive the secret key that is used to secure communications.

Using these techniques, the base station may generate and transmit reference signals based on channel associated with various UEs such that the various UEs are to identify the same target value that is used to derive the secret key. Thus, these techniques may support use of secret keys in group common signaling. Additionally, the use of the channel estimation to generate the downlink reference signal, in addition to use of the corresponding antennas for transmission/reception at the legitimate UE, may support the appearance of fast fading channel at illegitimate UEs. As such, the illegitimate UEs may not be able to identify the target value that is used to derive the key. As a result, security may be improved in the wireless communications system. These and other techniques are described in further detail with respect to the figures. As described herein, a secret key may also be referred to as a security key, encryption key, decryption key, encoding key, decoding key, symmetric key, cryptographic key, or the like.

Aspects of the disclosure are initially described in the context of wireless communications systems. Aspects of the disclosure are further described with respect to wireless communications systems illustrating a security key generation procedure. Aspects of the disclosure are further illustrated by and described with reference to process flow diagrams, apparatus diagrams, system diagrams, and flowcharts that relate to channel for eavesdropping-mitigation and secret key generation.

FIG. 1 illustrates an example of a wireless communications system 100 that supports channel for eavesdropping-mitigation and secret key generation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or wuplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support physical layer security schemes between a base station 105 and UEs 115 and/or between UEs 115. In some cases, these physical layer security schemes may rely on the position of the UE 115 relative to the base station 105 to derive secret keys that are used to secure communications. As the position of the UE 115 relative to the base station 105 may impact various channel characteristics, the use of channel estimation to determine secret keys may improve security within the wireless communications system 100. That is, various UEs 115 may have different channel characteristics due to differences in position relative to a particular base station 105, and as a result, the use of channel characteristics may support improved security in the wireless communications system 100.

According to some secret key extract procedures. two devices, such as a base station 105 and a UE 115, may exchange reference signals. Each device (e.g., the base station 105 and the UE 115) may estimate its channel based on the received reference signal and obtain a metric based on the channel (e.g., channel power, reference signal received power (RSRP), signal interference to noise ratio, phase). The obtained metric may be quantized and mapped to a value that is used as a secret key or used to derive a secret key. Thus, due to channel reciprocity, the secret key may be obtained by both devices. At high signal to noise environments, these techniques may be secured, or the repetition of pilot signals or other key refinement procedures may be used. The secret key may be used by the base station 105 and the UE 115 to secure communications, such as by securing fields within a physical channel (e.g., information in a PDCCH, PUCCH, PDSCH, and/or PUSCH).

Techniques described herein support additional security by using random antennas, channel estimation, and target values to configure secret keys at UEs 115. For example, a UE 115 may sound an antenna (e.g., transmit an SRS using the antenna) and receive a CSI-RS using the same antenna. The base station may estimate the channel using the received SRS and a set of antennas. The base station may generate and transmit a downlink reference signal (CSI-RS) based on the channel estimation of the SRS such that the receiving UE 115 is able to determine a target value that is used to derive a secret key. Because the same antenna is used to transmit the SRS and receive the downlink reference signal at the UE 115, and because the same set of antennas is used to estimate the channel and transmit the downlink reference signal at the base station 105, the base station may configure the downlink reference signal such that only the legitimate UE 115 is able to identify the target value that is used to derive the key. However, the base station 105 may use the same procedure (e.g., channel estimation and reference signal generation) such that other legitimate UEs 115 are able to derive the same key. Thus, these techniques may be used to secure group common messages, such as group common downlink control information (DCI) messages.

Figure 2:
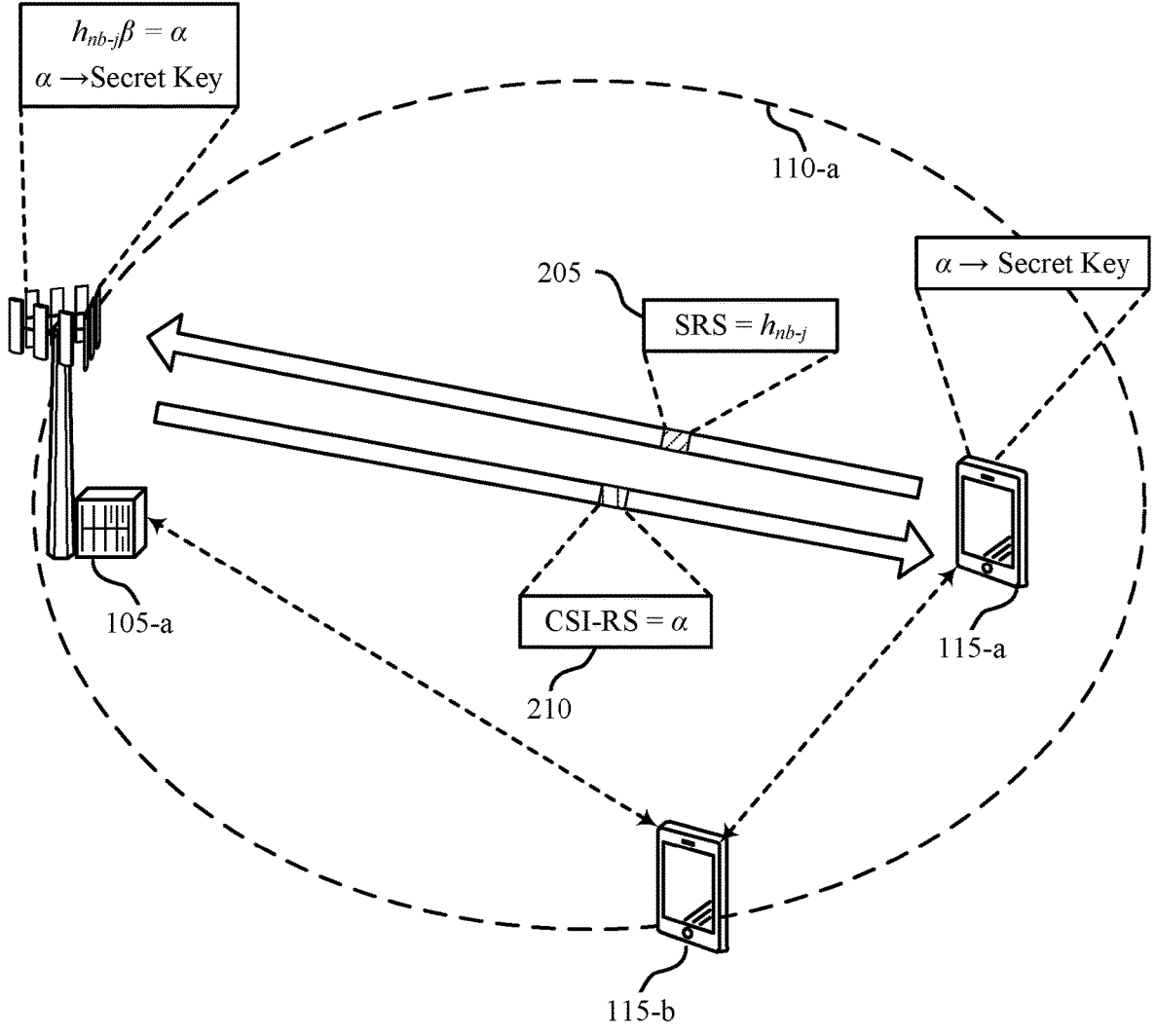
FIG. 2 illustrates an example of a wireless communications system that supports channel for eavesdropping-mitigation and secret key generation in accordance with aspects of the present disclosure.

FIG. 2 illustrates an example of a wireless communications system 200 that supports channel for eavesdropping-mitigation and secret key generation in accordance with aspects of the present disclosure. The wireless communications system 200 includes a base station 105-*a*, a UE 115-*a*, and a UE 115-*b*, which may be examples of the corresponding devices of wireless communications system 100 of FIG. 1. Various aspects of techniques described with respect to FIG. 2 may be performed by devices other than base station 105-*a* and UE 115-*a*. For example, various aspects of the techniques described herein may be performed by two UEs 115 in a sidelink communication scenario.

Base station 105-*a* may communicate with UE 115-*a* that is positioned within a coverage area 110-*a* of the base station 105-*a* according to techniques described herein. For example, base station 105-*a* and UE 115-*a* may use the techniques described herein to derive a secret key that is used to secure various communications between the UE 115-*a* and the base station 105-*a*. In some cases, the derived secret key may be used to secure information communicated using resources of a PDCCH, PDSCH, PUSCH, or a PUCCH. The UE 115-b may be an example of an illegitimate UE, or a UE that is not an intended recipient of secure communicates between the UE 115-a and the base station 105-a. The UE 115-b may be referred to as an "eavesdropper." Thus, the UE 115-a communicates with the base station 105-a while UE 115-b may eavesdrop on such communications. The UE 115-a and the base station 105-a may use higher layer security schemes. To further improve security, the physical layer security scheme described herein depends on channel characteristics and is used to secure control channels (e.g., NR control channels), such an uplink control information (UCI) and downlink control information (DCI). Securing the control channels (e.g., UCI and DCI) may make it difficult for the eavesdroppers (e.g., UE 115-b) to perform decoding and disturb activities that may secure the system. Thus, these physical layer security schemes may be used in addition to the upper layer security schemes to further secure the wireless communications system 100.

According to the security key generation procedure described herein, which may be configured via control signaling (e.g., RRC signaling), the UE 115-a may use a particular reception antenna to sound the channel. In some cases, the base station 105-a may and the UE 115-b may agree on the antenna that is used to sound the channel. That is, the base station 105-a may configure the UE 115-a as to which antenna is used to sound the channel, or the UE 115-a may indicate to the base station 105-a which antenna that it will use to sound the channel. To sound the channel, the UE 115-a transmits an SRS 205 to the base station 105-a using the configured antenna (e.g., the j-th antenna). As described in further detail herein, the downlink reference signal (e.g., CSI-RS) is to be received by the UE 115-a using the same antenna that is used to sound the channel.

According to the security key generation procedure, the base station 105-a may receive the SRS 205 using a set of antennas of a plurality of antennas configured at the base station 105-a. The base station may estimate the channel as $h_{gNB\text{-}j}$, on predefined/preconfigured resource blocks (RBs) or resource elements (REs) based on the SRS 205. The RBs, the REs, or both may be RRC configured. The base station 105-a may identify a target value, a, that is to be used to derive a secret key for securing communications between the base station 105-a and the UE 115-a. The target value a may be a value of a random string of bits, a value associated with a key that is to be used for communications with other UEs 115 (e.g., for a group common communication scenario). In some examples, the value a is one bit of a longer string of characters or is a QAM signal.

The base station 105-a may transmit a by multiplying the base station 105-a transmit antennas using β, where β may change from one transmission to the other and from one RE to the other. The transmit antennas are the same antennas that are used to estimate the channel as $h_{gNB\text{-}j}$. The base station 105-a may use a condition such that $h_{gNB\text{-}j}\beta=\alpha$. As such, the base station may transmit a downlink reference signal 210 (e.g., a CSI-RS) to the UE 115-a. The UE 115-a use the set of antennas that were used to transmit the SRS 205 to receive the downlink reference signal 210. The base station 105-a and the UE 115-a may use the quantized version of a or the bits (if a is a QAM signal) to secure fields in DCI/UCI. In some examples, the quantized version of a or the bits are a seed used to generate larger bit sequence using pseudo-random generator or a key derivation function. The larger bit sequence may function as the key to secure the entire DCI/UCI transmission or full data channels (PDSCH/ PUSCH). In some cases, security may be maintained by using an exclusive or operation (XOR) (e.g., one-time pad or Vernam cipher scheme) with the information/data bits and the secret key bits. Thus, for any node or device (e.g., UE 115-b or other base station 105) that does not know the key, the data is unknown, and the legitimate UE 115-a may derive the key and identify the data using the key.

In some cases, the technique used to identify a may be configured by the base station1 105-a using control signaling. For example, the technique to identify a may be configured via RRC or medium access control layer control element (MAC-CE) signaling. If the UE is to use QAM bits as a, then the QAM point (e.g., time to identify the QAM point) may be signaled via control signaling (e.g., L1/L2/L3 indication). If a corresponds to a bit or set of bits, then the RBs or REs that are used to identify the values for a may be signaled. Similarly, a set of quantization levels associated with the downlink reference signal 210 that are used to identify a may be signaled via control signaling. Further, the start time, initialization time, or the like during which the UE 115-a is to begin the key derivation procedure (e.g., to transmit the SRS 205) may be signaled via control signaling.

To support these techniques, the single port used for receiving the downlink reference signal 210 (e.g., CSI-RS or tracking reference signal (TRS)) is quasi co-located with the SRS resource with the port is used for the secret key generation procedure. As such, the base station 105-a is able to estimate the channel (e.g., using the SRS 205) and set, make, or force the received downlink reference signal at the UE side REs to be equal to a target value, a. From the value of a, the secret key may be generated. That is, the base station 105-a may set this value to a level such that a target key value can be generated at the UE 115-a. The secret key may be used to secure one or more fields in a physical channel (e.g., information in a PDCCH, PUCCH, PDSCH, or PUSCH).

As described, the base station 105-a may estimate the channel as $h_{gNB\text{-}j}$, where j is the sounded SRS resource. Using the channel of the sounding SRS resource at the UE 115-a, the base station 105-a may set the value of the downlink reference signal as α. In some cases, $y_j=h_{gNB\text{-}j}\beta+n_j=\alpha+n_j$, where $h_{gNB\text{-}j}\in C^{1\times N_{gNB}}$ is the channel vector between base station 105-a and the j-th reception antenna at the UE 115-a, and the channel vector may be estimated at the base station 105-a via SRS 205 signal from UE 115-a by sounding reception antenna j, $\beta\in C^{N_{gNB}\times1}$ is a randomly generated vector of elements according to any distribution used at the base station 105-a (no other node or device is to know the values or distributions of those weights/elements), a is a configured scalar value set to be the key bits (the QAM values in some cases) or a value that is going to be quantized using certain quantization levels, and $n_j$ is the additive white gaussian noise (AWGN) at the received radiofrequency (RF) chain. The β vector may be randomly generated (note that last element could encounter for the linear equation constraint after randomly generating all elements) using $h_{gNB\text{-}j}\beta=\alpha$. In some examples, the design of the downlink reference signal 210 account for the transmit power constraint of the UE 115-a.

According to the techniques described herein, the UE 115-a may receive the j-th $\alpha+n_j$, while any other nodes (e.g., UEs 115-b) receives a fast-fading signal where the received signal at a resource element (RE) is y_any_node= $h_{gNB\text{-}any_{node}}\beta+n\_any\_node$. If it is assumed that $h_{gNB\text{-}any\_node}$ is known at the UE 115-b (eavesdropper) and tries to identify the key (or α), which may be a worst-case scenario for the secure system, then the system still uses β as unknown and random including unknown distribution to all other nodes including the UE 115-a. Further, if it is assumed that the line of sight (LOS) between the base station 105-*a* and the UE 115-*a* is $h_{gNB\text{-}any_{node}}$ is equal to all-ones, then y_any_node= $(\Sigma_k h_{gNB\_k\text{-}any_{node}} \beta_k)$+n_any_node where $\beta_k$ is the k-th element of $\beta$, $h_{gNB\_k\text{-}any_{node}}$ is the k-th element of $h_{gNB\text{-}any_{node}}$ and $\Sigma_k h_{gNB\_k\text{-}any_{node}} \beta_k$ is a random variable (with $\beta_k$ generated by the base station 105-*a* at the k-th transmission antenna of the base station 105-*a*), which may be unknown to all receivers. If it is assumed $\beta$ is a Gaussian random variable (RV) vector, then for a known and within a coherent time transmission (e.g., . . . , $h_{gNB\_k\text{-}any_{node}}$ is known at the receiver and fixed during coherence time), $g = \Sigma_k h_{gNB\_k\text{-}any_{node}} \beta_k$ is a Gaussian RV. Thus, the received signal at any reception antenna of any node (e.g., UE 115-*b*) except the legit node (e.g., UE 115-*a*) is $y_{any\text{-}node} = g + n_{any\text{-}node}$, where g is a Gaussian RV, which is unknown at the receivers and may be changing rapidly as controlled by the base station 105-*a*.

As such, decoding at illegitimate nodes, such as UE 115-*b*, may be complex. The decoding for illegitimate nodes may be like decoding under fading channel with no channel knowledge at all at the receiver. As the base station 105-*a* does not send reference signals (e.g., downlink reference signal 210) without precoding, the eavesdropper (e.g., UE 115-*a*) will not be able to estimate its own channel (e.g., between the UE 115-*b* and the base station 105-*a*), so essentially, $h_{gNB\text{-}any_{node}}$ is mostly unknown at the eavesdroppers. Even if $h_{gNB\text{-}any_{node}}$ is assumed to be known, $\beta$ is unknown and supports renewable random fading (especially with random $\beta$ is used). For example, if it is assumed that $\alpha \in \{-1,1\}$ is Binary Phase Shift Keying (BPSK) (BPSK), the $\beta$ vector may be used to change the to set $\alpha=1$ or $-1$, and the eavesdropper may identify a Gaussian RV and assuming the eavesdropper estimates its own channel, the probability of error is ½ since probability of error of a Gaussian RV is less than 0 or greater than 0 (e.g., ½).

Thus, using these techniques, the UE 115-*a* and the base station 105-*a* may derive a secret key that is used to secure communications. Further, these techniques support key derivation such that illegitimate devices, such as UE 115-*b*, may be unable to derive the key. Additionally, as described herein, the base station 105-*a* may generate the downlink reference signal 210 such that the target value a may be identified at the receiving UE 115-*b*. These techniques may be used such that the same target value a may be identified at other UEs 115, thereby promoting use of secret key generation at multiple UEs 115. Thus, security of group common signals may be supported. As described in further detail with respect to FIG. 3, the base station 105-*a* and/or UE 115-*a* may use randomly selected antennas for secret key identification, which may further improve security in wireless communications systems.

In one particular example, the base station 105-*a* may be configured with three transmission antennas, and the UE 115-*a* is configured with one antenna or antenna port. In such cases, the base station 105-*a* may estimate the channel matrix via the SRS 205 transmission as $H_k$=[H1, H2, H3]. The base station 105-*a* is configured to deliver the secret key (e.g., $\alpha_k$) to the UE 115-*a* at resource element k. As such, the base station 105-*a* configures $H_k * P_k = \alpha_k$, where $H_k$=[H1, H2, H3] is the channel matrix between the base station 105-*a* and the UE 105-*a* at resource element k, $P_3^k$=[P1, P2, P3] is a random-element precoder used at the base station 105-*a* on resource element k, and $\alpha_k$ is the desired key (or key seed) to be delivered to the UE 105-*a*. The base station 105-*a* may generate elements of $P_3^k$ to be random except for a subset of the elements, such as the last element. Then the base station solves H1*P1+H2*P2+H3*P3=$\alpha$. H1, H3, H3, and a are known, and P1 and P3 are randomly generated based on a random codebook or random variable (e.g., Gaussian, Bernoulli, Nakagami, etc.). Then, the base station 105-*a* may obtain P3 (last element from $P_3^k$) from $P_3^k$=($\alpha$−(H1*P1+H2*P2))/H3 so that PN (assuming N elements in $P_k$ ports at base station 105-*a*), where N=3 in this example, is obtained deterministically. In general, there may be $P_N^k$ precoder ($P_N^k$ is the vector) with N elements such that K1 of the elements are random (up to N−1) and K2 (where K2>=1 with K1+K2=N) are obtained deterministically from the randomly generated elements and from channels using the linear equation:

$$H1*P1+H2*P2+H3*P3+\ldots+HNPN=\alpha.$$

Figure 3:
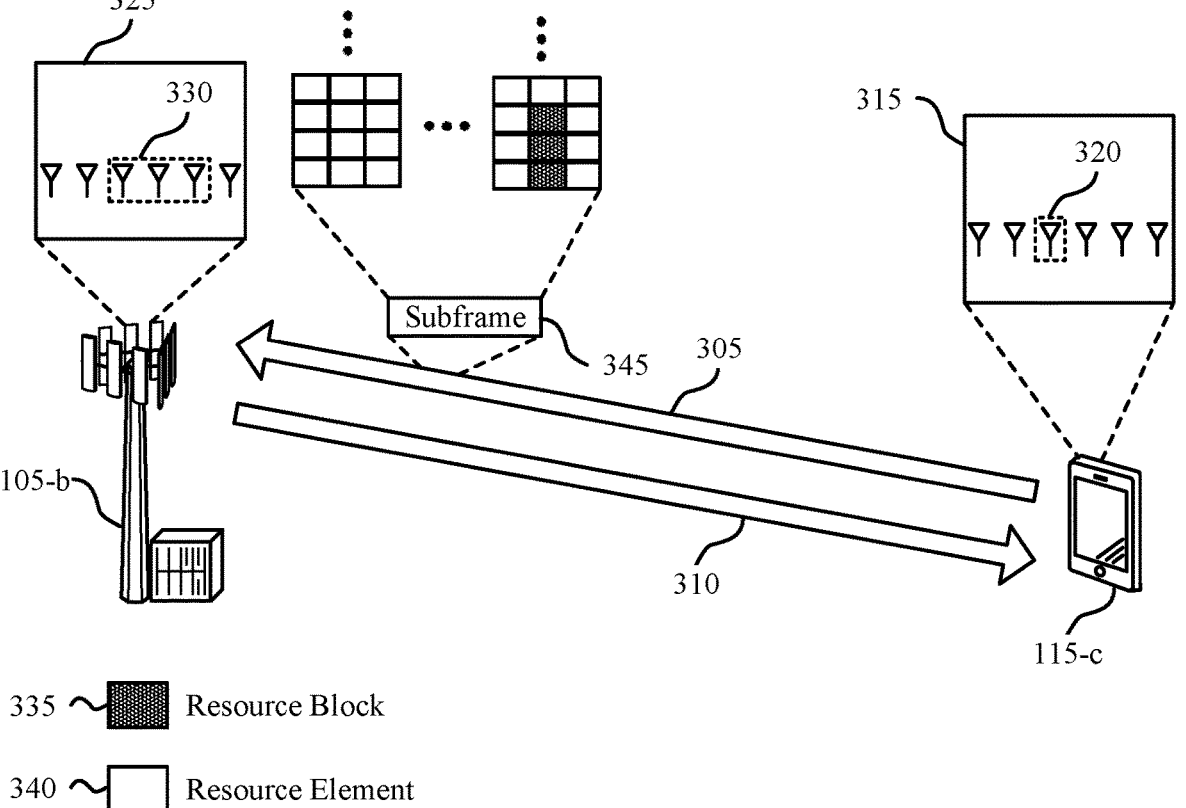
FIG. 3 illustrates an example of a wireless communications system that supports channel for eavesdropping-mitigation and secret key generation in accordance with aspects of the present disclosure.

FIG. 3 illustrates an example of a wireless communications system 300 that supports channel for eavesdropping-mitigation and secret key generation in accordance with aspects of the present disclosure. The wireless communications system 300 includes a base station 105-*b* and a UE 115-*c*, which may be examples of the corresponding devices of wireless communications system 100 of FIG. 1 and wireless communications system 200 of FIG. 2. Various aspects of techniques described with respect to FIG. 3 may be performed by devices other than base station 105-*b* and UE 115-*c*. For example, various aspects of the techniques described herein may be performed by two UEs 115 in a sidelink communication scenario.

Base station 105-*b* may communicate with UE 115-*c* using communications that are secured according to the security key generation procedure as described herein. As described with respect to FIG. 2, the UE 115-*c* may transmit an SRS 305 to the base station 105-*b*. The base station 105-*b* may estimate the channel based on the received SRS and generate and transmit a downlink reference signal to the UE 115-*c*. The base station 105-*b* may generate the reference signal based on the channel estimation such that the UE 115-*c* identifies a target value a that is used to derive the secret key for securing communications.

The UE 115-*c* may be configured with a set of antennas 315, each of which may correspond to an SRS resource/port. As described herein, the UE 115-*c* may sound the j-th antenna of the set of antennas 315. In this case, the UE sounds antenna 320. In some examples, the sounded antenna may be configured by the base station 105-*b*. In other examples, the sounded antenna may be randomly selected. In either example, the antenna that is used to sound the channel is to be used to receive the downlink reference signal 310.

The base station 105-*b* may also be configured with a set of antennas 325. The base station may receive the SRS using some or all the set of antennas 325. The base station 105-*b* may estimate the channel based on the SRS 305 using a subset of the antennas 330, and the base station 105-*b* is to use the same subset of the antennas 330 for transmission of the downlink reference signal 310. In some examples, the base station 105-*a* is to estimate the channel using a set of preconfigured resources of one or more subframes, such as subframe 345. For example, the base station 105-*a* may estimate the channel using one or more resource elements 340 or one or more resource blocks 335 that are preconfigured using control signaling.

The subset of antennas 330 that are used to estimate the channel based on the SRS 305 and transmit the downlink reference signal 310 may be randomly select with a size L. L may be as large as the number of antennas configured at the base station 105-*b* (e.g., $L=N_{gNB}$). The base station 105-*b* may select the best M antenna ports corresponding to the channel from the base station 105-*a* to the sounded antenna 320 of the UE 115-*c*. For example, the base station 105-*b* may determine the best antennas/antenna ports to RSRP, reference signal received quality (RSRQ), and/or signal to interference plus noise ratio (SINR) measured for the SRS 305. The base station 105-*a* may use one or more of the M antennas for channel estimation and for transmission of the downlink reference signal. Note that the base station 105-*b* may estimate all the channels using all the antennas. However, for the key generation procedure, the base station 105-*b* may select a subset of antennas/(e.g., random antennas) to further confuse any eavesdroppers. This process may be transparent to the legitimate/target UE 115-*c* since the base station 105-*b* may design 8 to remove the channel impact while obtaining the key bits. This procedure may be performed per resource element 340 that is preconfigured for key generation, and the number of key bits that are extracted may depend on the number of independent REs 340 that are selected.

Figure 4:
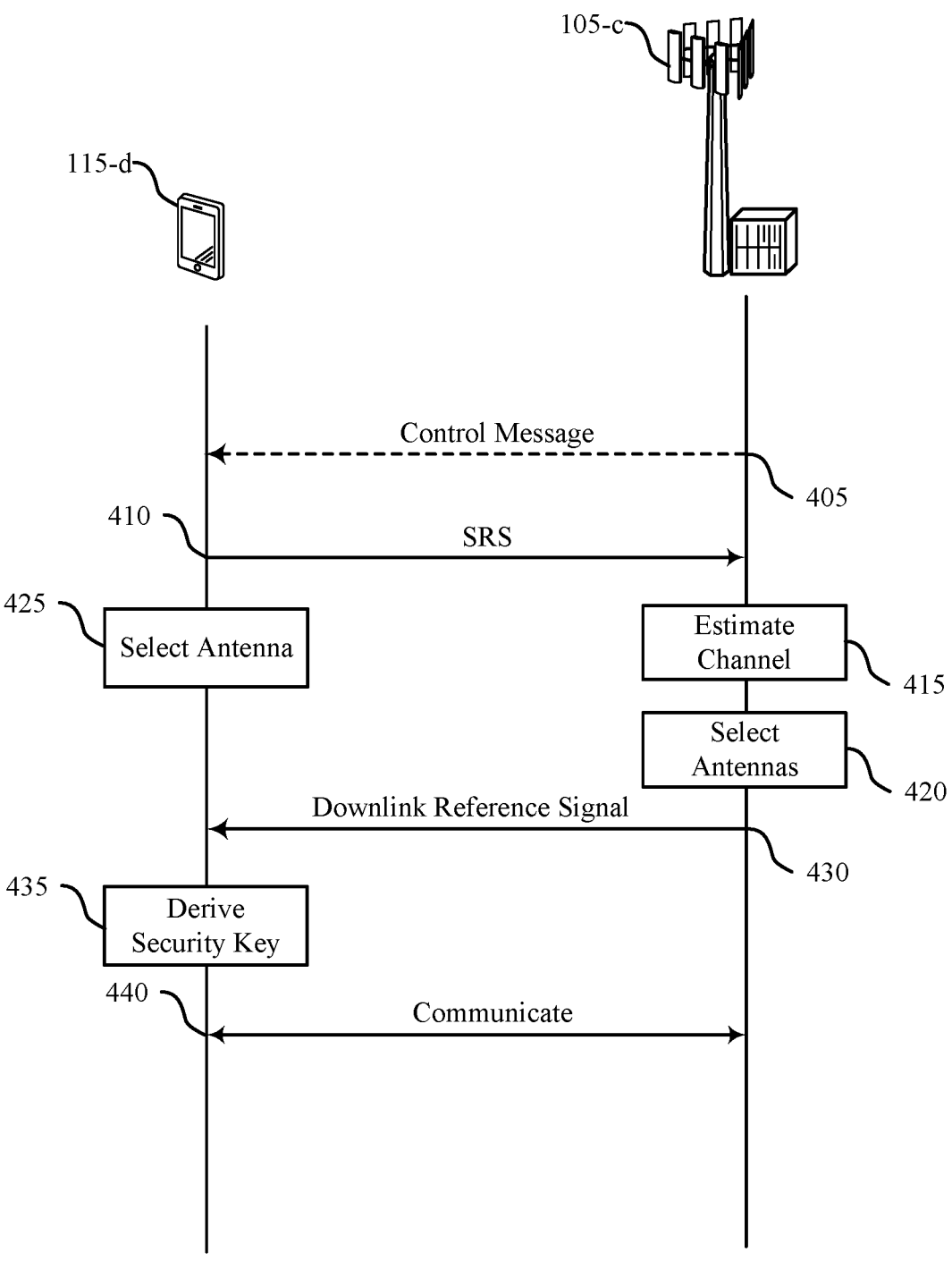
FIG. 4 illustrates an example of a process flow that supports channel for eavesdropping-mitigation and secret key generation in accordance with aspects of the present disclosure.

FIG. 4 illustrates an example of a process flow 400 that supports channel for eavesdropping-mitigation and secret key generation in accordance with aspects of the present disclosure. In some examples, process flow 400 may implement aspects of wireless communications systems 100, 200, and 300 as described with reference to FIGS. 1 through 3. Process flow 400 may include a first UE 115-*f* and a second UE 115-*g*, which may be examples of UEs 115, as described with reference to FIGS. 1 through 3.

The process flow 400 illustrates an exemplary order of actions performed by the UE 115-*d* and the base station 105-*c* to perform secure communications. In the following description of the process flow 400, the operations between the UE 115-*d* and the base station 105-*c* may be transmitted in a different order than the exemplary order shown, or the operations performed by the UE 115-*d* and the base station 105-*c* may be performed in different orders or at different times. Certain operations may also be omitted from the process flow 400, and/or other operations may be added to the process flow 400.

At 405, the UE 115-*d* may receive, from the base station 105-*c*, a control message that indicates a configuration for the security key generation procedure, wherein the security key is derived based at least in part on the configuration. The control message may be a RRC message, MAC-CE message, DCI message, or a combination thereof. The configuration may include a set of quantization levels that are used to identify a value associated with a downlink reference signal. The configuration may include a complex value (e.g., QAM point) that is used to identify one or more bits for deriving a security key. The configuration may include an indication of a start time or initialization period during which the security key generation procedure is to begin. The start time or initialization period may correspond to a time during which the SRS signal is transmitted by the UE 115-*d*.

At 410, the UE 115-*d* may transmit, to the base station 105-*c*, a SRS using a first antenna of a plurality of antennas configured at the UE 115-*d*. The first antenna may be preconfigured by the base station 105-*c* (e.g., using the control signaling) or may be randomly selected by the UE 115-*d*.

At 415, the base station 105-*c* may estimate a channel between the UE 115-*d* and the base station 105-*c* based on the SRS and using a set of antennas of a plurality of antennas configured at the base station 105-*c*. The base station 105-*c* may receive and estimate multiple channels using some or all the antennas at the base station 105-*c*. At 420, the base station 105-*c* may select the set of antennas to transmit a downlink reference signal to the UE. The antennas may be selected based on the set of antennas being used for reception of the sounding reference signal and on the base station using the sounding reference signal as part of the security key generation procedure for communications between the UE 115-*d* and the base station 105-*c*.

At 425, the UE 115-*d* may select the first antenna to receive a downlink reference signal from the base station. The selection of the first antenna may be based at least in part on the first antenna being used for transmission of the SRS and on the UE using the downlink reference signal as part of the security key generation procedure for communications between the UE 115-*d* and the base station 105-*c*.

At 430, the UE 115-*d* may receive the downlink reference signal from the base station using the first antenna. The downlink reference signal may be generated by the base station 105-*c* based at least in part on the estimated channel to produce a target value (e.g., a) that is to be used, by the UE 115-*d*, to derive a security key to be used to secure the communications between the UE 115-*d* and the base station 105-*c*. The downlink reference signal may be an example of a CSI-RS. The downlink reference signal may be randomly precoded using a Gaussian RV procedure. That is, the precoder vector (used at a RE) may be composed of random elements (e.g., random parameters) such that the target value $\alpha_k$ is set on $RE_k$.

At 435, the UE 115-*d* may derive, via the security key generation procedure and using a value associated with the downlink reference signal, the security key to be used to secure the communications between the UE 115-*d* and the base station 105-*c*. In some cases, the UE 115-*d* may determine a quantized version of the value associated with the downlink reference signal in accordance with the security key generation procedure and input the quantized version of the value into a key derivation function to derive the security key. The key derivation function may be an example of a pseudo-random generator. In some examples, the UE 115-*d* may determine the value using QAM point in accordance with the security key generation procedure. The values associated with the QAM point may function as the security key, a portion thereof, or a seed as an input into a key derivation function. The value may be determined over one or more resources (e.g., REs and/or RBs) via channel estimations over the one or more resources.

At 440, the UE 115-*d* may communicate with the base station 105-*c* via the communications secured using the security key. For example, the UE 115-*d* may encode various fields of a UCI message using the derived security key, and the base station 105-*a* my decode the fields of the UCI message using the derived security key. Similarly, the base station 105-*d* may encode fields of a DCI message, and the UE 115-*d* may decode the fields of the DCI message using the security key. Other fields may of PUSCH, PUCCH, PDSCH, or PDCCH channels may be encoded/decoded using the security key. In a sidelink communications scenario, fields of a physical sidelink control channel (PSCCH) or physical sidelink shared channel (PSSCH) may be encoded/decoded using a security key derived by two UEs 115 using the techniques described herein.

Figure 5:
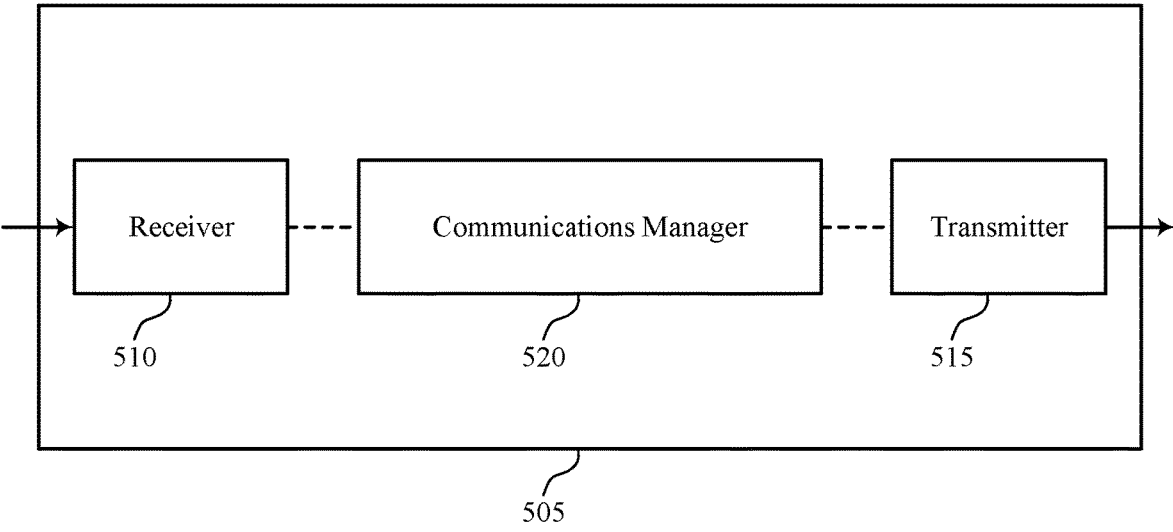
FIGS. 5 and 6 show block diagrams of devices that support channel for eavesdropping-mitigation and secret key generation in accordance with aspects of the present disclosure.

FIG. 5 shows a block diagram 500 of a device 505 that supports channel for eavesdropping-mitigation and secret key generation in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to channel for eavesdropping-mitigation and secret key generation). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to channel for eavesdropping-mitigation and secret key generation). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of channel for eavesdropping-mitigation and secret key generation as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for transmitting, to a base station, a sounding reference signal using a first antenna of a set of multiple antennas configured at the UE. The communications manager 520 may be configured as or otherwise support a means for selecting the first antenna in order to receive a downlink reference signal from the base station, selection of the first antenna based on the first antenna being used for transmission of the sounding reference signal and on the UE using the downlink reference signal as part of a security key generation procedure for communications between the UE and the base station. The communications manager 520 may be configured as or otherwise support a means for receiving the downlink reference signal from the base station using the first antenna. The communications manager 520 may be configured as or otherwise support a means for deriving, via the security key generation procedure and using a value associated with the downlink reference signal, a security key to be used to secure the communications between the UE and the base station. The communications manager 520 may be configured as or otherwise support a means for communicating with the base station via the communications secured using the security key.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reducing processing by implementing security features in the physical layer, thereby avoiding or limiting use of upper layers, with more processing overhead, for security purposes.

Figure 6:
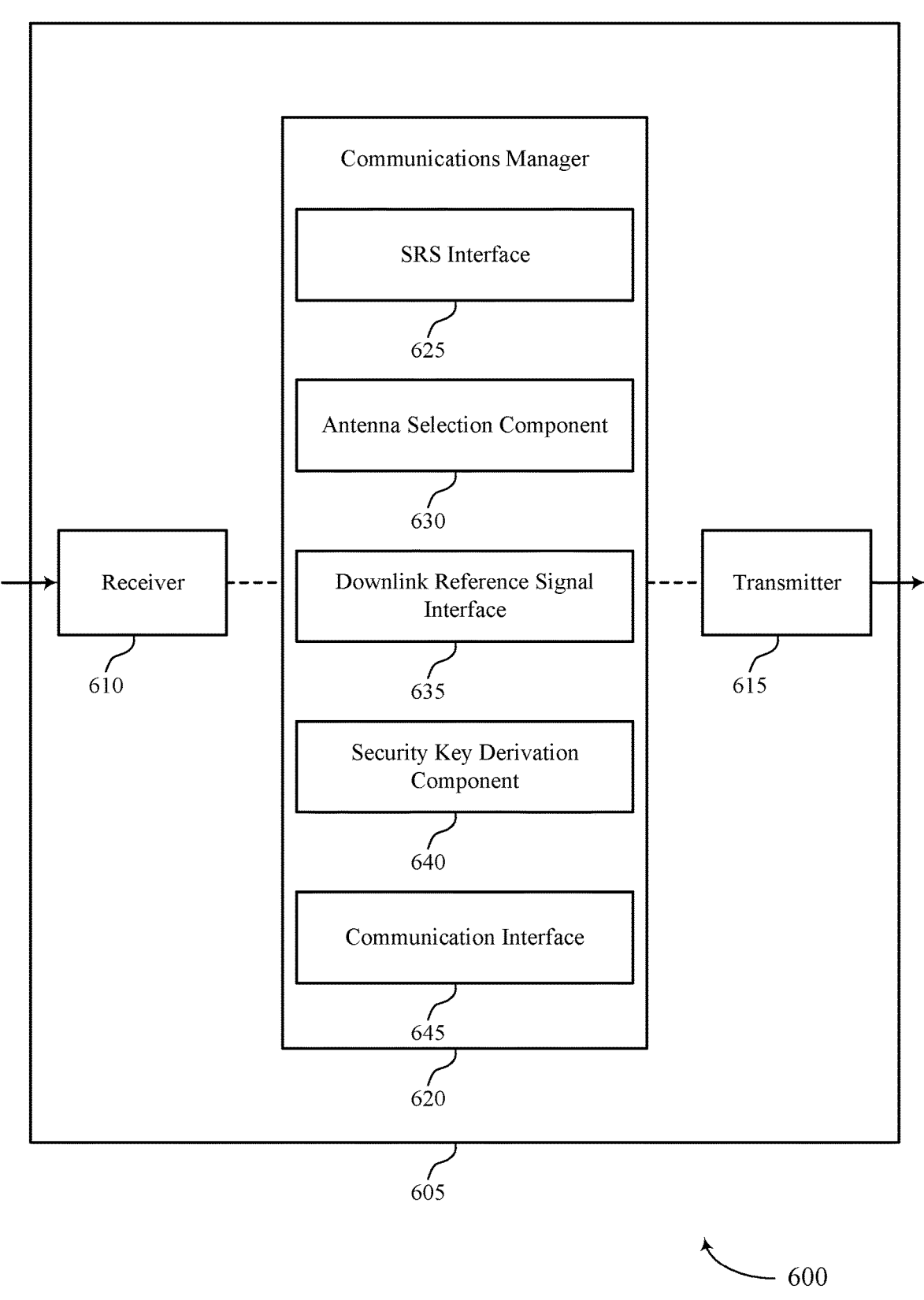

FIG. 6 shows a block diagram 600 of a device 605 that supports channel for eavesdropping-mitigation and secret key generation in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to channel for eavesdropping-mitigation and secret key generation). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to channel for eavesdropping-mitigation and secret key generation). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of channel for eavesdropping-mitigation and secret key generation as described herein. For example, the communications manager 620 may include an SRS interface 625, an antenna selection component 630, a downlink reference signal interface 635, a security key derivation component 640, a communication interface 645, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The SRS interface 625 may be configured as or otherwise support a means for transmitting, to a base station, a sounding reference signal using a first antenna of a set of multiple antennas configured at the UE. The antenna selection component 630 may be configured as or otherwise support a means for selecting the first antenna in order to receive a downlink reference signal from the base station, selection of the first antenna based on the first antenna being used for transmission of the sounding reference signal and on the UE using the downlink reference signal as part of a security key generation procedure for communications between the UE and the base station. The downlink reference signal interface 635 may be configured as or otherwise support a means for receiving the downlink reference signal from the base station using the first antenna. The security key derivation component 640 may be configured as or otherwise support a means for deriving, via the security key generation procedure and using a value associated with the downlink reference signal, a security key to be used to secure the communications between the UE and the base station. The communication interface 645 may be configured as or otherwise support a means for communicating with the base station via the communications secured using the security key.

Figure 7:
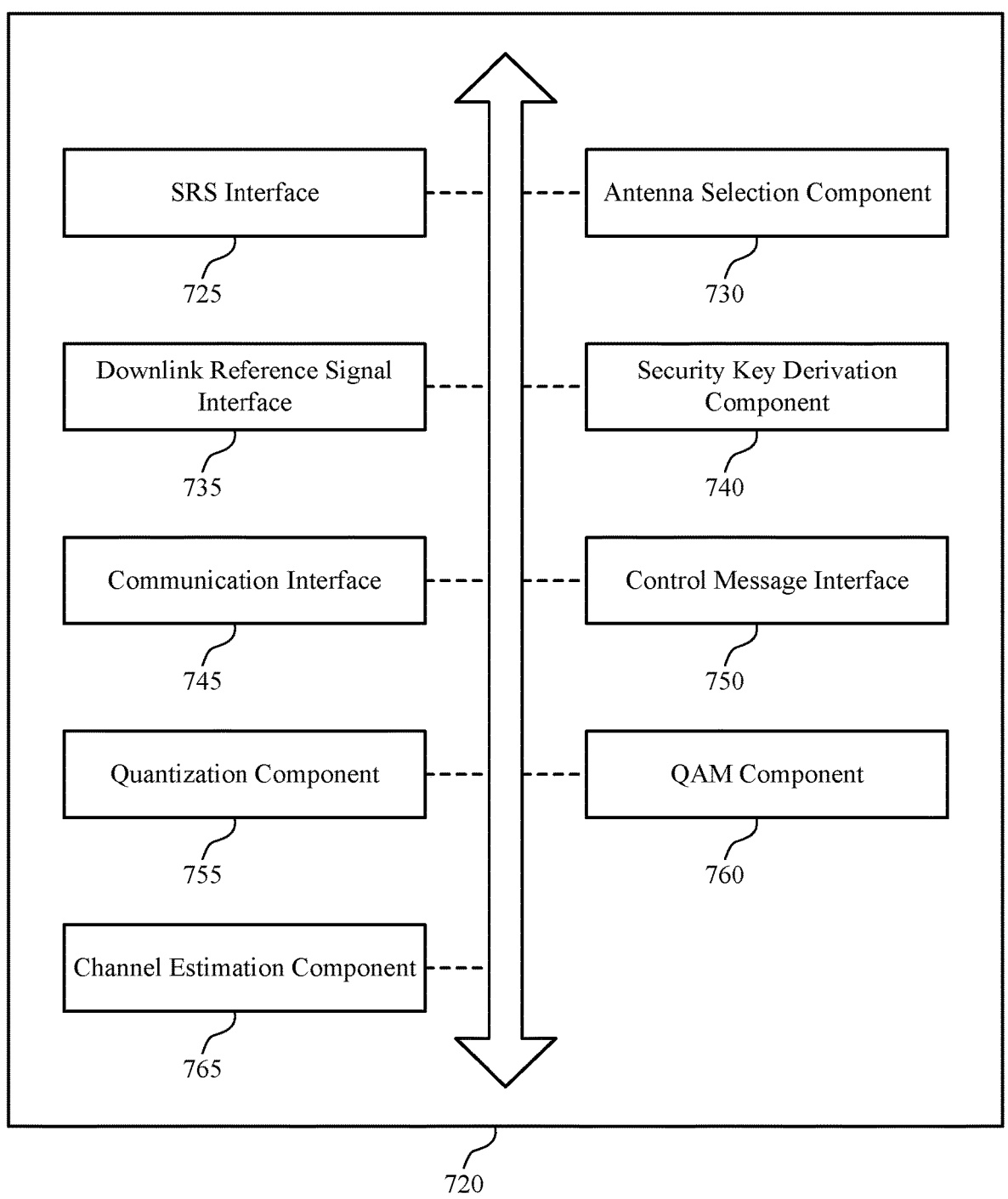
FIG. 7 shows a block diagram of a communications manager that supports channel for eavesdropping-mitigation and secret key generation in accordance with aspects of the present disclosure.

FIG. 7 shows a block diagram 700 of a communications manager 720 that supports channel for eavesdropping-mitigation and secret key generation in accordance with aspects of the present disclosure. The communications manager 720 may be an example of aspects of a communications manager 520, a communications manager 620, or both, as described herein. The communications manager 720, or various components thereof, may be an example of means for performing various aspects of channel for eavesdropping-mitigation and secret key generation as described herein. For example, the communications manager 720 may include an SRS interface 725, an antenna selection component 730, a downlink reference signal interface 735, a security key derivation component 740, a communication interface 745, a control message interface 750, a quantization component 755, a QAM component 760, a channel estimation component 765, or any combination thereof. Each of these components may communicate, directly or indirectly, with one another (e.g., via one or more buses).

The communications manager 720 may support wireless communication at a UE in accordance with examples as disclosed herein. The SRS interface 725 may be configured as or otherwise support a means for transmitting, to a base station, a sounding reference signal using a first antenna of a set of multiple antennas configured at the UE. The antenna selection component 730 may be configured as or otherwise support a means for selecting the first antenna in order to receive a downlink reference signal from the base station, selection of the first antenna based on the first antenna being used for transmission of the sounding reference signal and on the UE using the downlink reference signal as part of a security key generation procedure for communications between the UE and the base station. The downlink reference signal interface 735 may be configured as or otherwise support a means for receiving the downlink reference signal from the base station using the first antenna. The security key derivation component 740 may be configured as or otherwise support a means for deriving, via the security key generation procedure and using a value associated with the downlink reference signal, a security key to be used to secure the communications between the UE and the base station. The communication interface 745 may be configured as or otherwise support a means for communicating with the base station via the communications secured using the security key.

In some examples, the control message interface 750 may be configured as or otherwise support a means for receiving, from the base station, a control message that indicates a configuration for the security key generation procedure, where the security key is derived based on the configuration.

In some examples, to support receiving the control message, the control message interface 750 may be configured as or otherwise support a means for receiving the control message that indicates a set of quantization levels associated with the downlink reference signal, where the UE uses a quantized value of the downlink reference signal and a quantization level of the set of quantization levels to derive the security key.

In some examples, to support receiving the control message, the control message interface 750 may be configured as or otherwise support a means for receiving the control message that indicates that the UE is to use a complex value to derive the security key, where the complex value is a QAM point and is associated with the downlink reference signal is used to derive the security key.

In some examples, to support receiving the control message, the control message interface 750 may be configured as or otherwise support a means for receiving the control message that indicates an initialization time associated with derivation of the security key, where the sounding reference signal is transmitted in accordance with the initialization time.

In some examples, to support receiving the control message, the control message interface 750 may be configured as or otherwise support a means for receiving a radio resource control message, a medium access control layer control element message, or a downlink control information message.

In some examples, the quantization component 755 may be configured as or otherwise support a means for determining a quantized version of the value associated with the downlink reference signal in accordance with the security key generation procedure. In some examples, the security key derivation component 740 may be configured as or otherwise support a means for inputting the quantized version of the value into a key derivation function to derive the security key.

In some examples, the QAM component 760 may be configured as or otherwise support a means for determining the value using quadrature amplitude modulation (QAM) point in accordance with the security key generation procedure. In some examples, the security key derivation component 740 may be configured as or otherwise support a means for inputting the value into a key derivation function to derive the security key.

In some examples, the channel estimation component 765 may be configured as or otherwise support a means for determining the value associated with the downlink reference signal by estimating a channel associated with the downlink reference signal.

In some examples, the downlink reference signal interface 735 may be configured as or otherwise support a means for receiving, from the base station, a second downlink reference signal using a second resource. In some examples, the security key derivation component 740 may be configured as or otherwise support a means for deriving a second security key to be used to secure subsequent communications between the UE and the base station, where the UE communicates with the base station based on the second security key.

In some examples, the antenna selection component 730 may be configured as or otherwise support a means for randomly selecting the first antenna to transmit the sounding reference signal.

In some examples, to support receiving the downlink reference signal, the downlink reference signal interface 735 may be configured as or otherwise support a means for receiving a channel state information reference signal.

In some examples, to support receiving the downlink reference signal, the downlink reference signal interface 735 may be configured as or otherwise support a means for receiving the downlink reference signal that is precoded with random precoding parameters.

In some examples, to support communicating with the base station, the communication interface 745 may be configured as or otherwise support a means for encoding information bits of an uplink message using the security key. In some examples, to support communicating with the base station, the communication interface 745 may be configured as or otherwise support a means for transmitting, to the base station, the encoded uplink message.

Figure 8:
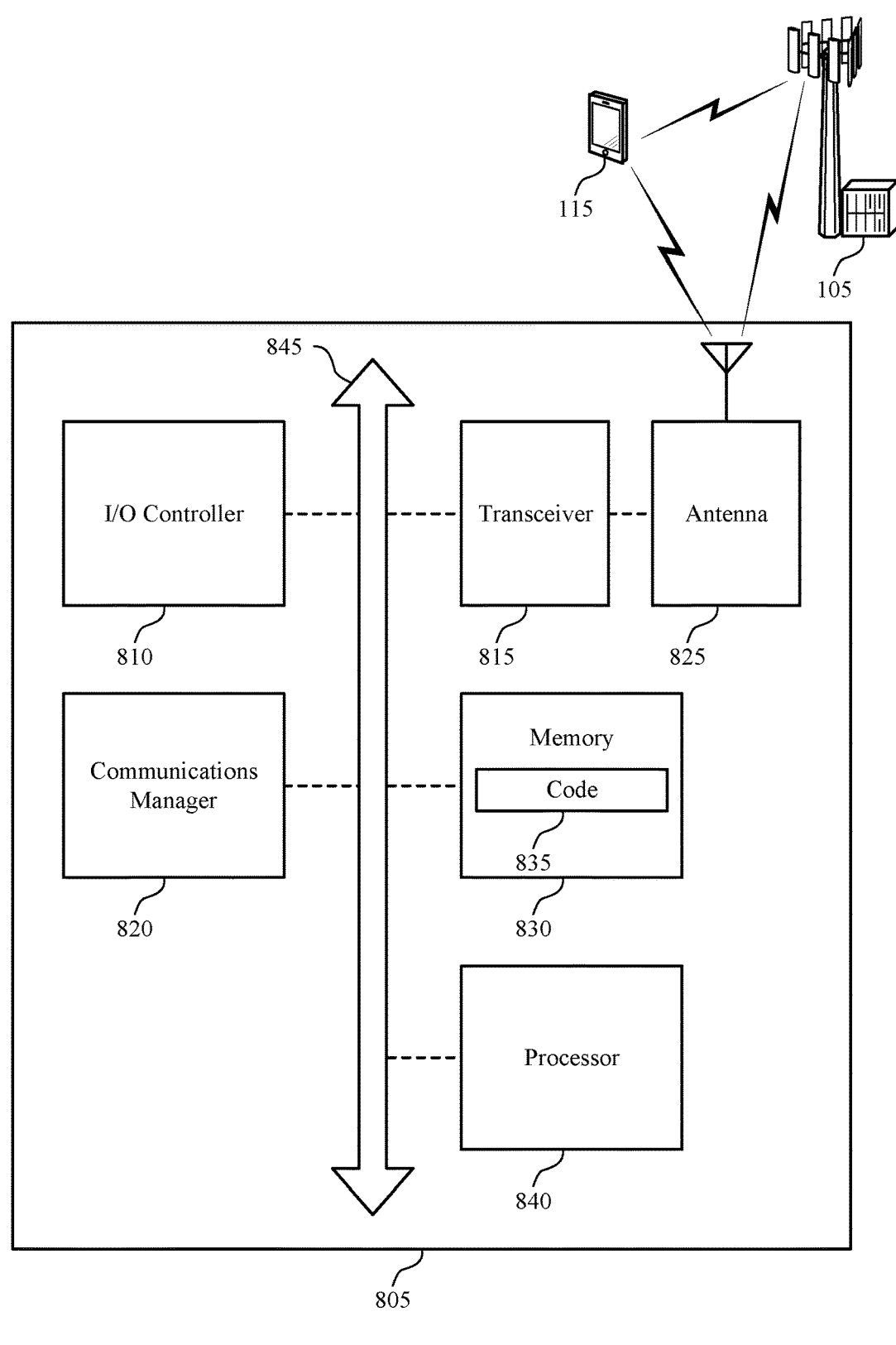
FIG. 8 shows a diagram of a system including a device that supports channel for eavesdropping-mitigation and secret key generation in accordance with aspects of the present disclosure.

FIG. 8 shows a diagram of a system 800 including a device 805 that supports channel for eavesdropping-mitigation and secret key generation in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting channel for eavesdropping-mitigation and secret key generation). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for transmitting, to a base station, a sounding reference signal using a first antenna of a set of multiple antennas configured at the UE. The communications manager 820 may be configured as or otherwise support a means for selecting the first antenna in order to receive a downlink reference signal from the base station, selection of the first antenna based on the first antenna being used for transmission of the sounding reference signal and on the UE using the downlink reference signal as part of a security key generation procedure for communications between the UE and the base station. The communications manager 820 may be configured as or otherwise support a means for receiving the downlink reference signal from the base station using the first antenna. The communications manager 820 may be configured as or otherwise support a means for deriving, via the security key generation procedure and using a value associated with the downlink reference signal, a security key to be used to secure the communications between the UE and the base station. The communications manager 820 may be configured as or otherwise support a means for communicating with the base station via the communications secured using the security key.

By including or configuring the communications manager 820 in accordance with examples as described herein, the device 805 may support techniques for improved security in a wireless communications system by adding additional security features at the physical layer.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of channel for eavesdropping-mitigation and secret key generation as described herein, or the processor 840 and the memory 830 may be otherwise configured to perform or support such operations.

Figure 9:
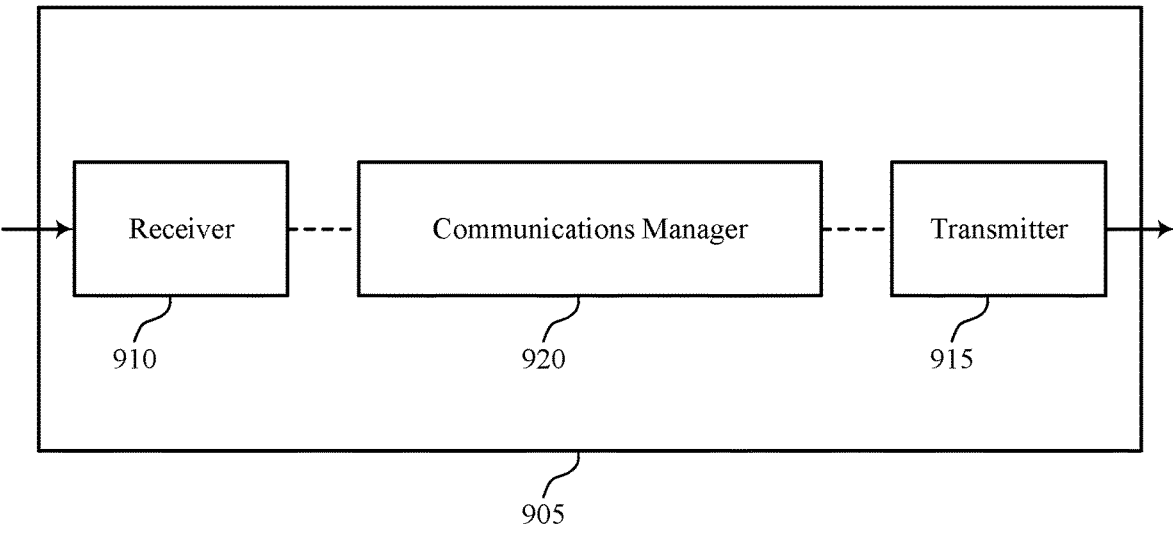
FIGS. 9 and 10 show block diagrams of devices that support channel for eavesdropping-mitigation and secret key generation in accordance with aspects of the present disclosure.

FIG. 9 shows a block diagram 900 of a device 905 that supports channel for eavesdropping-mitigation and secret key generation in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to channel for eavesdropping-mitigation and secret key generation). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to channel for eavesdropping-mitigation and secret key generation). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of channel for eavesdropping-mitigation and secret key generation as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for receiving, from a UE, a sounding reference signal. The communications manager 920 may be configured as or otherwise support a means for estimating a channel between the UE and the base station based on the sounding reference signal and using a set of antennas of a set of multiple antennas configured at the base station. The communications manager 920 may be configured as or otherwise support a means for selecting the set of antennas in order to transmit a downlink reference signal to the UE, selection of the set of antennas based on the set of antennas being used for reception of the sounding reference signal and on the base station using the sounding reference signal as part of a security key generation procedure for communications between the UE and the base station. The communications manager 920 may be configured as or otherwise support a means for transmitting the downlink reference signal to the UE using the set of antennas, the downlink reference signal being generated based on the estimated channel to produce a target value that is to be used, by the UE, to derive a security key to be used to secure the communications between the UE and the base station. The communications manager 920 may be configured as or otherwise support a means for communicating with the UE via the communications secured using the security key.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reducing processing by implementing security features in the physical layer, thereby avoiding or limiting use of upper layers, with more processing overhead, for security purposes.

Figure 10:
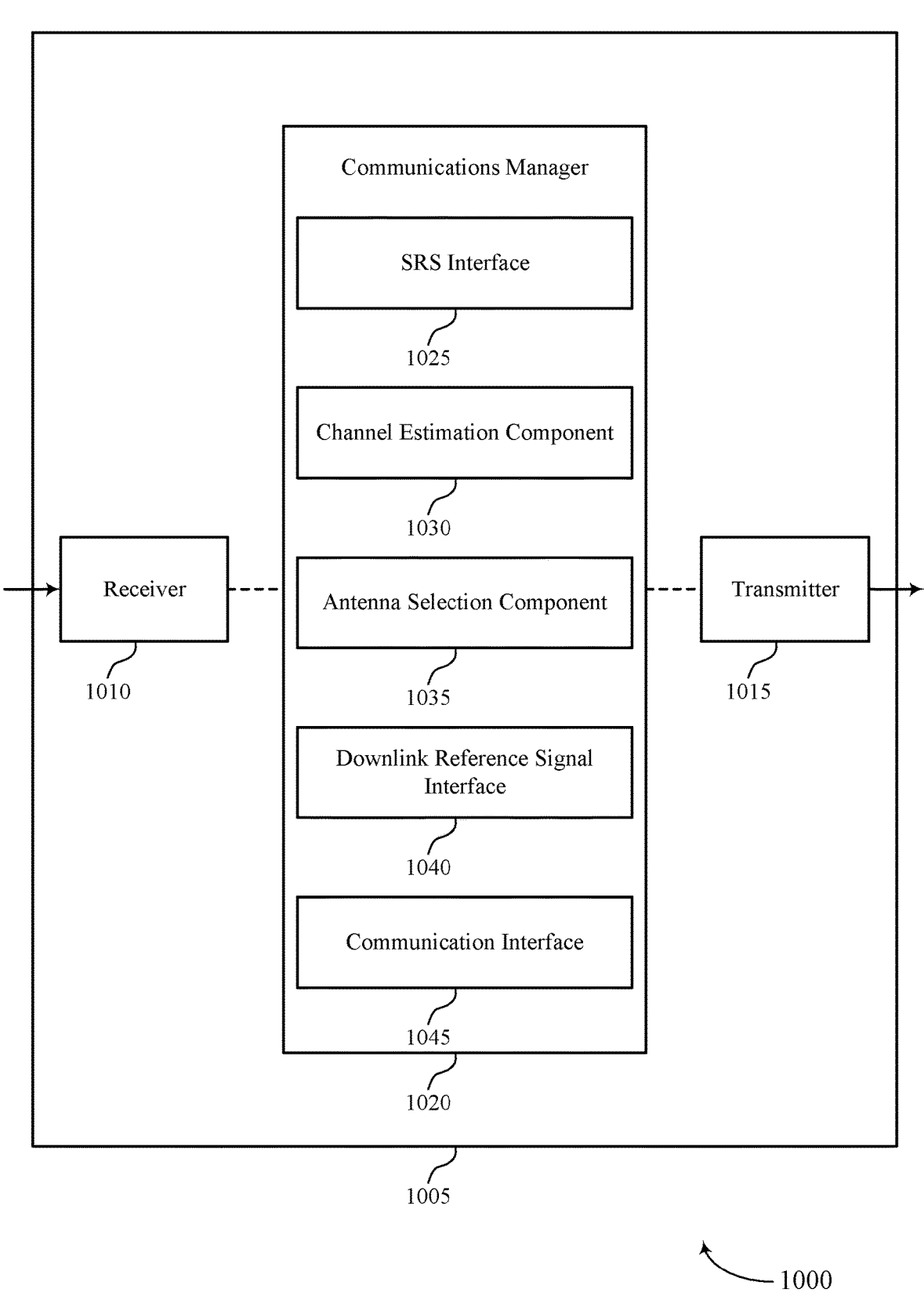

FIG. 10 shows a block diagram 1000 of a device 1005 that supports channel for eavesdropping-mitigation and secret key generation in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to channel for eavesdropping-mitigation and secret key generation). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to channel for eavesdropping-mitigation and secret key generation). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of channel for eavesdropping-mitigation and secret key generation as described herein. For example, the communications manager 1020 may include an SRS interface 1025, a channel estimation component 1030, an antenna selection component 1035, a downlink reference signal interface 1040, a communication interface 1045, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The SRS interface 1025 may be configured as or otherwise support a means for receiving, from a UE, a sounding reference signal. The channel estimation component 1030 may be configured as or otherwise support a means for estimating a channel between the UE and the base station based on the sounding reference signal and using a set of antennas of a set of multiple antennas configured at the base station. The antenna selection component 1035 may be configured as or otherwise support a means for selecting the set of antennas in order to transmit a downlink reference signal to the UE, selection of the set of antennas based on the set of antennas being used for reception of the sounding reference signal and on the base station using the sounding reference signal as part of a security key generation procedure for communications between the UE and the base station. The downlink reference signal interface 1040 may be configured as or otherwise support a means for transmitting the downlink reference signal to the UE using the set of antennas, the downlink reference signal being generated based on the estimated channel to produce a target value that is to be used, by the UE, to derive a security key to be used to secure the communications between the UE and the base station. The communication interface 1045 may be configured as or otherwise support a means for communicating with the UE via the communications secured using the security key.

Figure 11:
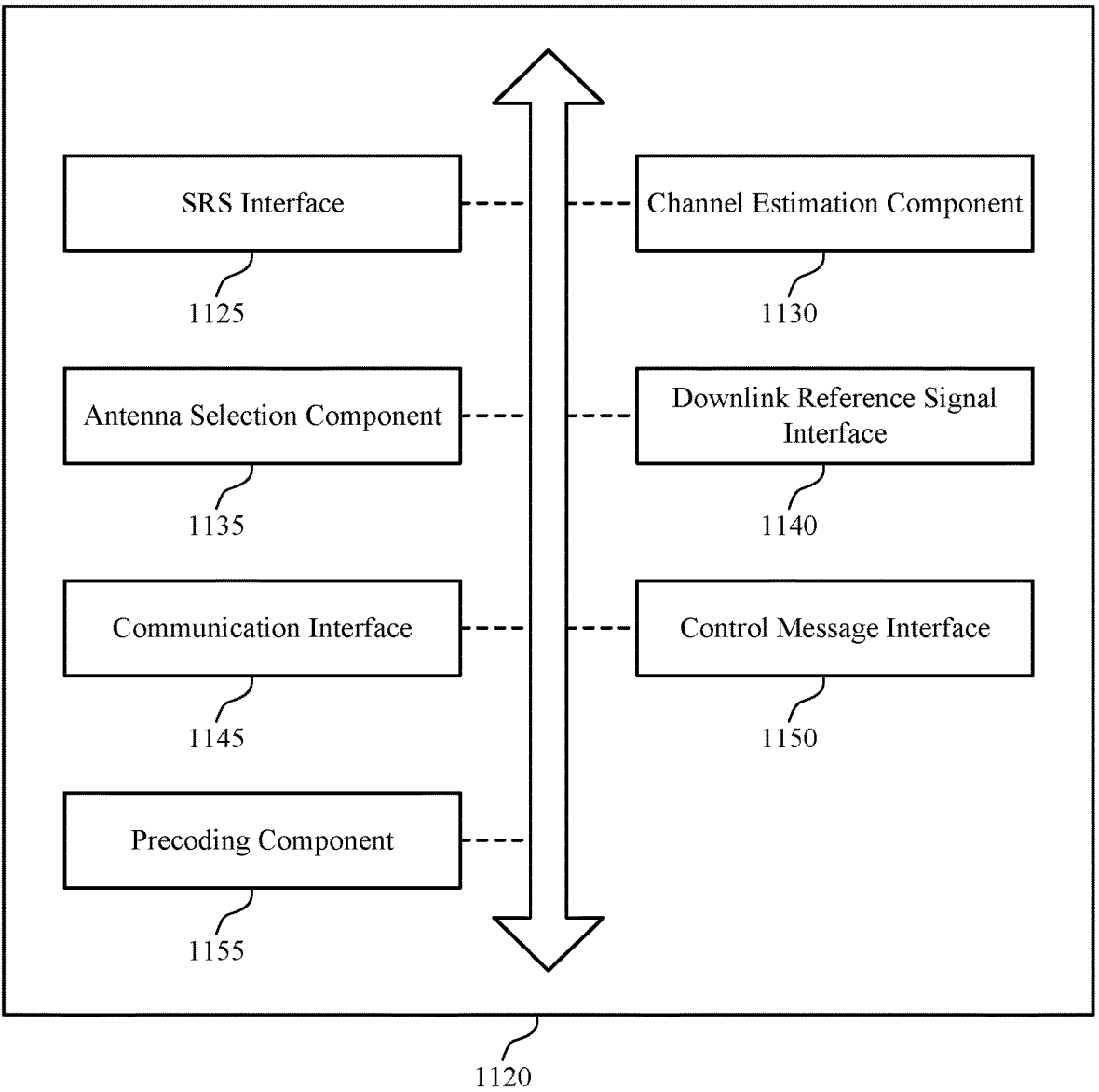
FIG. 11 shows a block diagram of a communications manager that supports channel for eavesdropping-mitigation and secret key generation in accordance with aspects of the present disclosure.

FIG. 11 shows a block diagram 1100 of a communications manager 1120 that supports channel for eavesdropping-mitigation and secret key generation in accordance with aspects of the present disclosure. The communications manager 1120 may be an example of aspects of a communications manager 920, a communications manager 1020, or both, as described herein. The communications manager 1120, or various components thereof, may be an example of means for performing various aspects of channel for eavesdropping-mitigation and secret key generation as described herein. For example, the communications manager 1120 may include an SRS interface 1125, a channel estimation component 1130, an antenna selection component 1135, a downlink reference signal interface 1140, a communication interface 1145, a control message interface 1150, a precoding component 1155, or any combination thereof. Each of these components may communicate, directly or indirectly, with one another (e.g., via one or more buses).

The communications manager 1120 may support wireless communications at a base station in accordance with examples as disclosed herein. The SRS interface 1125 may be configured as or otherwise support a means for receiving, from a UE, a sounding reference signal. The channel estimation component 1130 may be configured as or otherwise support a means for estimating a channel between the UE and the base station based on the sounding reference signal and using a set of antennas of a set of multiple antennas configured at the base station. The antenna selection component 1135 may be configured as or otherwise support a means for selecting the set of antennas in order to transmit a downlink reference signal to the UE, selection of the set of antennas based on the set of antennas being used for reception of the sounding reference signal and on the base station using the sounding reference signal as part of a security key generation procedure for communications between the UE and the base station. The downlink reference signal interface 1140 may be configured as or otherwise support a means for transmitting the downlink reference signal to the UE using the set of antennas, the downlink reference signal being generated based on the estimated channel to produce a target value that is to be used, by the UE, to derive a security key to be used to secure the communications between the UE and the base station. The communication interface 1145 may be configured as or otherwise support a means for communicating with the UE via the communications secured using the security key.

In some examples, the control message interface 1150 may be configured as or otherwise support a means for transmitting, to the UE, a control message that indicates a configuration for the security key generation procedure, where the base station communicates with the UE based on the configuration.

In some examples, to support transmitting the control message, the control message interface 1150 may be configured as or otherwise support a means for transmitting the control message that indicates a set of quantization levels associated with the downlink reference signal, where a quantized value of the downlink reference signal and a quantization level of the set of quantization levels to derive the security key.

In some examples, to support transmitting the control message, the control message interface 1150 may be configured as or otherwise support a means for transmitting the control message that indicates that the UE is to use a complex value to derive the security key, where the complex value is a QAM point and is associated with the downlink reference signal is used to derive the security key.

In some examples, to support transmitting the control message, the control message interface 1150 may be configured as or otherwise support a means for transmitting the control message that indicates an initialization time associated with derivation of the security key, where the sounding reference signal is received in accordance with the initialization time.

In some examples, to support transmitting the control message, the control message interface 1150 may be configured as or otherwise support a means for transmitting a radio resource control message, a medium access control layer control element message, or a downlink control information message.

In some examples, the downlink reference signal interface 1140 may be configured as or otherwise support a means for transmitting, to the UE, a second downlink reference signal using a second resource, where the second downlink reference signal is used to derive a second security securing subsequent communications between the base station and the UE.

In some examples, the antenna selection component 1135 may be configured as or otherwise support a means for randomly selecting the set of antennas to use to estimate the channel and to transmit the downlink reference signal.

In some examples, the antenna selection component 1135 may be configured as or otherwise support a means for selecting the set of antennas based on a signal metric associated with the sounding reference signal for the set of multiple antennas configured at the base station.

In some examples, the signal metric is a reference signal received power, a reference signal received quality, or a signal-to-interference-plus-noise ratio.

In some examples, the precoding component 1155 may be configured as or otherwise support a means for selecting a precoding value for the downlink reference signal using the estimated channel such that the target value is identified at the UE.

In some examples, the precoding component 1155 may be configured as or otherwise support a means for randomly selecting a precoding value for the downlink reference signal and adding noise to the generated downlink reference signal using the estimated channel such that the target value is identified at the UE.

In some examples, to support randomly selecting the precoding value, the precoding component 1155 may be configured as or otherwise support a means for generating a random vector of elements using a pseudo-random generator function.

In some examples, to support communicating with the UE, the communication interface 1145 may be configured as or otherwise support a means for encoding information bits of a downlink message using the security key. In some examples, to support communicating with the UE, the communication interface 1145 may be configured as or otherwise support a means for transmitting, to the UE, the downlink message.

Figure 12:
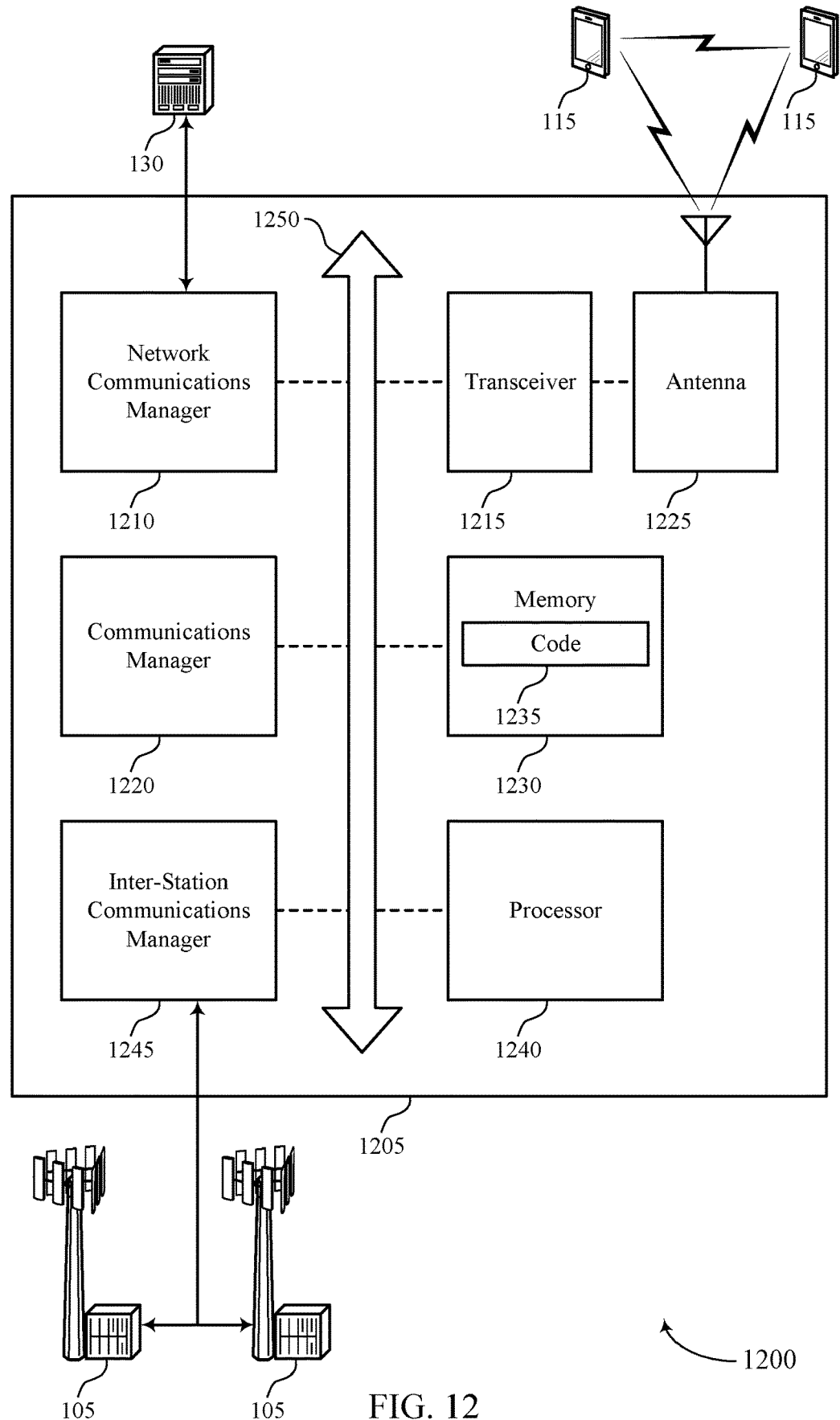
FIG. 12 shows a diagram of a system including a device that supports channel for eavesdropping-mitigation and secret key generation in accordance with aspects of the present disclosure.

FIG. 12 shows a diagram of a system 1200 including a device 1205 that supports channel for eavesdropping-mitigation and secret key generation in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting channel for eavesdropping-mitigation and secret key generation). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for receiving, from a UE, a sounding reference signal. The communications manager 1220 may be configured as or otherwise support a means for estimating a channel between the UE and the base station based on the sounding reference signal and using a set of antennas of a set of multiple antennas configured at the base station. The communications manager 1220 may be configured as or otherwise support a means for selecting the set of antennas in order to transmit a downlink reference signal to the UE, selection of the set of antennas based on the set of antennas being used for reception of the sounding reference signal and on the base station using the sounding reference signal as part of a security key generation procedure for communications between the UE and the base station. The communications manager 1220 may be configured as or otherwise support a means for transmitting the downlink reference signal to the UE using the set of antennas, the downlink reference signal being generated based on the estimated channel to produce a target value that is to be used, by the UE, to derive a security key to be used to secure the communications between the UE and the base station. The communications manager 1220 may be configured as or otherwise support a means for communicating with the UE via the communications secured using the security key.

By including or configuring the communications manager 1220 in accordance with examples as described herein, the device 1205 may support techniques for improved security in a wireless communications system by adding additional security features at the physical layer.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of channel for eavesdropping-mitigation and secret key generation as described herein, or the processor 1240 and the memory 1230 may be otherwise configured to perform or support such operations.

FIG. 13 shows a flowchart illustrating a method 1300 that supports channel for eavesdropping-mitigation and secret key generation in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include transmitting, to a base station, a sounding reference signal using a first antenna of a set of multiple antennas configured at the UE. The operations of 1305 may be performed in accordance with examples as disclosed herein. In some examples, aspects of the operations of 1305 may be performed by an SRS interface 725 as described with reference to FIG. 7.

At 1310, the method may include selecting the first antenna in order to receive a downlink reference signal from the base station, selection of the first antenna based on the first antenna being used for transmission of the sounding reference signal and on the UE using the downlink reference signal as part of a security key generation procedure for communications between the UE and the base station. The operations of 1310 may be performed in accordance with examples as disclosed herein. In some examples, aspects of the operations of 1310 may be performed by an antenna selection component 730 as described with reference to FIG. 7.

At 1315, the method may include receiving the downlink reference signal from the base station using the first antenna. The operations of 1315 may be performed in accordance with examples as disclosed herein. In some examples, aspects of the operations of 1315 may be performed by a downlink reference signal interface 735 as described with reference to FIG. 7.

At 1320, the method may include deriving, via the security key generation procedure and using a value associated with the downlink reference signal, a security key to be used to secure the communications between the UE and the base station. The operations of 1320 may be performed in accordance with examples as disclosed herein. In some examples, aspects of the operations of 1320 may be performed by a security key derivation component 740 as described with reference to FIG. 7.

At 1325, the method may include communicating with the base station via the communications secured using the security key. The operations of 1325 may be performed in accordance with examples as disclosed herein. In some examples, aspects of the operations of 1325 may be performed by a communication interface 745 as described with reference to FIG. 7.

FIG. 14 shows a flowchart illustrating a method 1400 that supports channel for eavesdropping-mitigation and secret key generation in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, from the base station, a control message that indicates a configuration for the security key generation procedure, where the security key is derived based on the configuration. The operations of 1405 may be performed in accordance with examples as disclosed herein. In some examples, aspects of the operations of 1405 may be performed by a control message interface 750 as described with reference to FIG. 7.

At 1410, the method may include randomly selecting the first antenna to transmit the sounding reference signal. The operations of 1410 may be performed in accordance with examples as disclosed herein. In some examples, aspects of the operations of 1410 may be performed by an antenna selection component 730 as described with reference to FIG. 7.

At 1415, the method may include transmitting, to a base station, a sounding reference signal using a first antenna of a set of multiple antennas configured at the UE. The operations of 1415 may be performed in accordance with examples as disclosed herein. In some examples, aspects of the operations of 1415 may be performed by an SRS interface 725 as described with reference to FIG. 7.

At 1420, the method may include selecting the first antenna in order to receive a downlink reference signal from the base station, selection of the first antenna based on the first antenna being used for transmission of the sounding reference signal and on the UE using the downlink reference signal as part of a security key generation procedure for communications between the UE and the base station. The operations of 1420 may be performed in accordance with examples as disclosed herein. In some examples, aspects of the operations of 1420 may be performed by an antenna selection component 730 as described with reference to FIG. 7.

At 1425, the method may include receiving the downlink reference signal from the base station using the first antenna. The operations of 1425 may be performed in accordance with examples as disclosed herein. In some examples, aspects of the operations of 1425 may be performed by a downlink reference signal interface 735 as described with reference to FIG. 7.

At 1430, the method may include deriving, via the security key generation procedure and using a value associated with the downlink reference signal, a security key to be used to secure the communications between the UE and the base station. The operations of 1430 may be performed in accordance with examples as disclosed herein. In some examples, aspects of the operations of 1430 may be performed by a security key derivation component 740 as described with reference to FIG. 7.

At 1435, the method may include communicating with the base station via the communications secured using the security key. The operations of 1435 may be performed in accordance with examples as disclosed herein. In some examples, aspects of the operations of 1435 may be performed by a communication interface 745 as described with reference to FIG. 7.

FIG. 15 shows a flowchart illustrating a method 1500 that supports channel for eavesdropping-mitigation and secret key generation in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1505, the method may include receiving, from a UE, a sounding reference signal. The operations of 1505 may be performed in accordance with examples as disclosed herein. In some examples, aspects of the operations of 1505 may be performed by an SRS interface 1125 as described with reference to FIG. 11.

At 1510, the method may include estimating a channel between the UE and the base station based on the sounding reference signal and using a set of antennas of a set of multiple antennas configured at the base station. The operations of 1510 may be performed in accordance with examples as disclosed herein. In some examples, aspects of the operations of 1510 may be performed by a channel estimation component 1130 as described with reference to FIG. 11.

At 1515, the method may include selecting the set of antennas in order to transmit a downlink reference signal to the UE, selection of the set of antennas based on the set of antennas being used for reception of the sounding reference signal and on the base station using the sounding reference signal as part of a security key generation procedure for communications between the UE and the base station. The operations of 1515 may be performed in accordance with examples as disclosed herein. In some examples, aspects of the operations of 1515 may be performed by an antenna selection component 1135 as described with reference to FIG. 11.

At 1520, the method may include transmitting the downlink reference signal to the UE using the set of antennas, the downlink reference signal being generated based on the estimated channel to produce a target value that is to be used, by the UE, to derive a security key to be used to secure the communications between the UE and the base station. The operations of 1520 may be performed in accordance with examples as disclosed herein. In some examples, aspects of the operations of 1520 may be performed by a downlink reference signal interface 1140 as described with reference to FIG. 11.

At 1525, the method may include communicating with the UE via the communications secured using the security key. The operations of 1525 may be performed in accordance with examples as disclosed herein. In some examples, aspects of the operations of 1525 may be performed by a communication interface 1145 as described with reference to FIG. 11.

FIG. 16 shows a flowchart illustrating a method 1600 that supports channel for eavesdropping-mitigation and secret key generation in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include transmitting, to the UE, a control message that indicates a configuration for the security key generation procedure, where the base station communicates with the UE based on the configuration. The operations of 1605 may be performed in accordance with examples as disclosed herein. In some examples, aspects of the operations of 1605 may be performed by a control message interface 1150 as described with reference to FIG. 11.

At 1610, the method may include randomly selecting the set of antennas to use to estimate the channel and to transmit the downlink reference signal. The operations of 1610 may be performed in accordance with examples as disclosed herein. In some examples, aspects of the operations of 1610 may be performed by an antenna selection component 1135 as described with reference to FIG. 11.

At 1615, the method may include receiving, from a UE, a sounding reference signal. The operations of 1615 may be performed in accordance with examples as disclosed herein. In some examples, aspects of the operations of 1615 may be performed by an SRS interface 1125 as described with reference to FIG. 11.

At 1620, the method may include estimating a channel between the UE and the base station based on the sounding reference signal and using a set of antennas of a set of multiple antennas configured at the base station. The operations of 1620 may be performed in accordance with examples as disclosed herein. In some examples, aspects of the operations of 1620 may be performed by a channel estimation component 1130 as described with reference to FIG. 11.

At 1625, the method may include selecting the set of antennas in order to transmit a downlink reference signal to the UE, selection of the set of antennas based on the set of antennas being used for reception of the sounding reference signal and on the base station using the sounding reference signal as part of a security key generation procedure for communications between the UE and the base station. The operations of 1625 may be performed in accordance with examples as disclosed herein. In some examples, aspects of the operations of 1625 may be performed by an antenna selection component 1135 as described with reference to FIG. 11.

At 1630, the method may include transmitting the downlink reference signal to the UE using the set of antennas, the downlink reference signal being generated based on the estimated channel to produce a target value that is to be used, by the UE, to derive a security key to be used to secure the communications between the UE and the base station. The operations of 1630 may be performed in accordance with examples as disclosed herein. In some examples, aspects of the operations of 1630 may be performed by a downlink reference signal interface 1140 as described with reference to FIG. 11.

At 1635, the method may include communicating with the UE via the communications secured using the security key. The operations of 1635 may be performed in accordance with examples as disclosed herein. In some examples, aspects of the operations of 1635 may be performed by a communication interface 1145 as described with reference to FIG. 11.

The following provides an overview of aspects of the present disclosure:

Aspect 1: A method for wireless communication at a UE, comprising: transmitting, to a base station, a sounding reference signal using a first antenna of a plurality of antennas configured at the UE; selecting the first antenna in order to receive a downlink reference signal from the base station, selection of the first antenna based at least in part on the first antenna being used for transmission of the sounding reference signal and on the UE using the downlink reference signal as part of a security key generation procedure for communications between the UE and the base station; receiving the downlink reference signal from the base station using the first antenna; deriving, via the security key generation procedure and using a value associated with the downlink reference signal, a security key to be used to secure the communications between the UE and the base station; and communicating with the base station via the communications secured using the security key.

Aspect 2: The method of aspect 1, further comprising: receiving, from the base station, a control message that indicates a configuration for the security key generation procedure, wherein the security key is derived based at least in part on the configuration.

Aspect 3: The method of aspect 2, wherein receiving the control message comprises: receiving the control message that indicates a set of quantization levels associated with the downlink reference signal, wherein the UE uses a quantized value of the downlink reference signal and a quantization level of the set of quantization levels to derive the security key.

Aspect 4: The method of any of aspects 2 through 3, wherein receiving the control message comprises: receiving the control message that indicates that the UE is to use a complex value to derive the security key, wherein the complex value is a QAM point and is associated with the downlink reference signal is used to derive the security key.

Aspect 5: The method of any of aspects 2 through 4, wherein receiving the control message comprises: receiving the control message that indicates an initialization time associated with derivation of the security key, wherein the sounding reference signal is transmitted in accordance with the initialization time.

Aspect 6: The method of any of aspects 2 through 5, wherein receiving the control message comprises: receiving a radio resource control message, a medium access control layer control element message, or a downlink control information message.

Aspect 7: The method of any of aspects 1 through 6, further comprising: determining a quantized version of the value associated with the downlink reference signal in accordance with the security key generation procedure; and inputting the quantized version of the value into a key derivation function to derive the security key.

Aspect 8: The method of any of aspects 1 through 7, further comprising: determining the value using quadrature amplitude modulation (QAM) point in accordance with the security key generation procedure; and inputting the value into a key derivation function to derive the security key.

Aspect 9: The method of any of aspects 1 through 8, further comprising: determining the value associated with the downlink reference signal by estimating a channel associated with the downlink reference signal.

Aspect 10: The method of any of aspects 1 through 9, wherein the downlink reference signal is received using a first resource, further comprising: receiving, from the base station, a second downlink reference signal using a second resource; and deriving a second security key to be used to secure subsequent communications between the UE and the base station, wherein the UE communicates with the base station based at least in part on the second security key.

Aspect 11: The method of any of aspects 1 through 10, further comprising: randomly selecting the first antenna to transmit the sounding reference signal.

Aspect 12: The method of any of aspects 1 through 11, wherein receiving the downlink reference signal comprises: receiving a channel state information reference signal.

Aspect 13: The method of any of aspects 1 through 12, wherein receiving the downlink reference signal comprises: receiving the downlink reference signal that is precoded with random parameters.

Aspect 14: The method of any of aspects 1 through 13, wherein communicating with the base station comprises: encoding information bits of an uplink message using the security key; and transmitting, to the base station, the encoded uplink message.

Aspect 15: A method for wireless communications at a base station, comprising: receiving, from a UE, a sounding reference signal; estimating a channel between the UE and the base station based at least in part on the sounding reference signal and using a set of antennas of a plurality of antennas configured at the base station; selecting the set of antennas in order to transmit a downlink reference signal to the UE, selection of the set of antennas based at least in part on the set of antennas being used for reception of the sounding reference signal and on the base station using the sounding reference signal as part of a security key generation procedure for communications between the UE and the base station; transmitting the downlink reference signal to the UE using the set of antennas, the downlink reference signal being generated based at least in part on the estimated channel to produce a target value that is to be used, by the UE, to derive a security key to be used to secure the communications between the UE and the base station; and communicating with the UE via the communications secured using the security key.

Aspect 16: The method of aspect 15, further comprising: transmitting, to the UE, a control message that indicates a configuration for the security key generation procedure, wherein the base station communicates with the UE based at least in part on the configuration.

Aspect 17: The method of aspect 16, wherein transmitting the control message comprises: transmitting the control message that indicates a set of quantization levels associated with the downlink reference signal, wherein a quantized value of the downlink reference signal and a quantization level of the set of quantization levels to derive the security key.

Aspect 18: The method of any of aspects 16 through 17, wherein transmitting the control message comprises: transmitting the control message that indicates that the UE is to use a complex value to derive the security key, wherein the complex value is a QAM point associated with the downlink reference signal is used to derive the security key.

Aspect 19: The method of any of aspects 16 through 18, wherein transmitting the control message comprises: transmitting the control message that indicates an initialization time associated with derivation of the security key, wherein the sounding reference signal is received in accordance with the initialization time.

Aspect 20: The method of any of aspects 16 through 19, wherein transmitting the control message comprises: transmitting a radio resource control message, a medium access control layer control element message, or a downlink control information message.

Aspect 21: The method of any of aspects 15 through 20, further comprising: transmitting, to the UE, a second downlink reference signal using a second resource, wherein the second downlink reference signal is used to derive a second security securing subsequent communications between the base station and the UE.

Aspect 22: The method of any of aspects 15 through 21, further comprising: randomly selecting the set of antennas to use to estimate the channel and to transmit the downlink reference signal.

Aspect 23: The method of any of aspects 15 through 22, further comprising: selecting the set of antennas based at least in part on a signal metric associated with the sounding reference signal for the plurality of antennas configured at the base station.

Aspect 24: The method of aspect 23, wherein the signal metric is a reference signal received power, a reference signal received quality, or a signal-to-interference-plus-noise ratio.

Aspect 25: The method of any of aspects 15 through 24, further comprising: selecting a precoding value for the downlink reference signal using the estimated channel such that the target value is identified at the UE.

Aspect 26: The method of any of aspects 15 through 25, further comprising: randomly selecting a precoding value for the downlink reference signal and adding noise to the generated downlink reference signal using the estimated channel such that the target value is identified at the UE.

Aspect 27: The method of aspect 26, wherein randomly selecting the precoding value comprises: generating a random vector of elements using a pseudo-random generator function.

Aspect 28: The method of any of aspects 15 through 27, wherein communicating with the UE comprises: encoding information bits of a downlink message using the security key; and transmitting, to the UE, the downlink message.

Aspect 29: An UE for wireless communications, comprising a processor; memory coupled with the processor; and instructions stored in the memory and executable by the processor to cause the UE to perform a method of any of aspects 1 through 14.

Aspect 30: A UE for wireless communications, comprising at least one means for performing a method of any of aspects 1 through 14.

Aspect 31: A non-transitory computer-readable medium storing code for wireless communication at a UE, the code comprising instructions executable by a processor to perform a method of any of aspects 1 through 14.

Aspect 32: A base station for wireless communications, comprising a processor; memory coupled with the processor; and instructions stored in the memory and executable by the processor to cause the base station to perform a method of any of aspects 15 through 28.

Aspect 33: A base station for wireless communications, comprising at least one means for performing a method of any of aspects 15 through 28.

Aspect 34: A non-transitory computer-readable medium storing code for wireless communications at a base station, the code comprising instructions executable by a processor to perform a method of any of aspects 15 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

transmitting, to a device, a sounding reference signal using a first antenna of a plurality of antennas configured at the UE;

selecting the first antenna in order to receive a downlink reference signal from the device, selection of the first antenna based at least in part on the first antenna being used for transmission of the sounding reference signal and on the UE using the downlink reference signal as part of a security key generation procedure for communications between the UE and the device;

receiving the downlink reference signal from the device using the first antenna;

deriving, via the security key generation procedure and using a value associated with the downlink reference signal, a security key to be used to secure the communications between the UE and the device; and communicating with the device via the communications between the UE and the device and secured using the security key.

2. The method of claim 1, further comprising:

receiving, from the device, a control message that indicates a configuration for the security key generation procedure, wherein the security key is derived based at least in part on the configuration.

3. The method of claim 2, wherein receiving the control message comprises:

receiving the control message that indicates a set of quantization levels associated with the downlink reference signal, wherein the UE uses a quantized value of the downlink reference signal and a quantization level of the set of quantization levels to derive the security key.

4. The method of claim 2, wherein receiving the control message comprises:

receiving the control message that indicates that the UE is to use a complex value to derive the security key, wherein the complex value is a QAM point and is associated with the downlink reference signal is used to derive the security key.

5. The method of claim 2, wherein receiving the control message comprises:

receiving the control message that indicates an initialization time associated with derivation of the security key, wherein the sounding reference signal is transmitted in accordance with the initialization time.

6. The method of claim 2, wherein receiving the control message comprises:

receiving a radio resource control message, a medium access control layer control element message, or a downlink control information message.

7. The method of claim 1, further comprising:

determining a quantized version of the value associated with the downlink reference signal in accordance with the security key generation procedure; and inputting the quantized version of the value into a key derivation function to derive the security key.

8. The method of claim 1, further comprising:

determining the value associated with the downlink reference signal using quadrature amplitude modulation (QAM) point in accordance with the security key generation procedure; and inputting the value associated with the downlink reference signal and determined using QAM point into a key derivation function to derive the security key.

9. The method of claim 1, further comprising:

determining the value associated with the downlink reference signal by estimating a channel associated with the downlink reference signal.

10. The method of claim 1, wherein the downlink reference signal is received using a first resource, further comprising:

receiving, from the device, a second downlink reference signal using a second resource; and deriving a second security key to be used to secure subsequent communications between the UE and the device, wherein the UE communicates with the device based at least in part on the second security key.

11. The method of claim 1, further comprising:

randomly selecting the first antenna to transmit the sounding reference signal.

12. The method of claim 1, wherein receiving the downlink reference signal comprises:

receiving a channel state information reference signal.

13. The method of claim 1, wherein receiving the downlink reference signal comprises:

receiving the downlink reference signal that is precoded with random precoding parameters.

14. The method of claim 1, wherein communicating with the device comprises:

encoding information bits of an uplink message using the security key; and transmitting, to the device, the encoded uplink message.

15. A method for wireless communications at a device, comprising:

receiving, from a user equipment (UE), a sounding reference signal;

estimating a channel between the UE and the device based at least in part on the sounding reference signal and using a set of antennas of a plurality of antennas configured at the device;

selecting the set of antennas in order to transmit a downlink reference signal to the UE, selection of the set of antennas based at least in part on the set of antennas being used for reception of the sounding reference signal and on the device using the sounding reference signal as part of a security key generation procedure for communications between the UE and the device;

transmitting the downlink reference signal to the UE using the set of antennas, the downlink reference signal being generated based at least in part on the estimated channel to produce a target value that is to be used, by the UE, to derive a security key to be used to secure the communications between the UE and the device; and communicating with the UE via the communications between the UE and the device and secured using the security key.

16. The method of claim 15, further comprising:

transmitting, to the UE, a control message that indicates a configuration for the security key generation procedure, wherein the device communicates with the UE based at least in part on the configuration.

17. The method of claim 16, wherein transmitting the control message comprises:

transmitting the control message that indicates a set of quantization levels associated with the downlink reference signal, wherein a quantized value of the downlink reference signal and a quantization level of the set of quantization levels to derive the security key.

18. The method of claim 16, wherein transmitting the control message comprises:

transmitting the control message that indicates that the UE is to use a complex value to derive the security key, wherein the complex value is a quadrature amplitude modulation (QAM) point and is associated with the downlink reference signal is used to derive the security key.

19. The method of claim 16, wherein transmitting the control message comprises:

transmitting the control message that indicates an initialization time associated with derivation of the security key, wherein the sounding reference signal is received in accordance with the initialization time.

20. The method of claim 15, further comprising:

randomly selecting the set of antennas to use to estimate the estimated channel between the UE and the device and to transmit the downlink reference signal.

21. The method of claim 15, further comprising:

selecting the set of antennas based at least in part on a signal metric associated with the sounding reference signal for the plurality of antennas configured at the device.

22. The method of claim 15, further comprising:

selecting a precoding value for the downlink reference signal using the estimated channel such that the target value is identified at the UE.

23. The method of claim 15, further comprising:

randomly selecting a precoding value for the downlink reference signal and adding noise to the generated downlink reference signal using the estimated channel such that the target value is identified at the UE.

24. The method of claim 23, wherein randomly selecting the precoding value comprises:

generating a random vector of elements using a pseudorandom generator function.

25. A user equipment (UE) for wireless communication, comprising:

a processor;

memory coupled with the processor; and instructions stored in the memory and executable by the processor to cause the UE to:

transmit, to a device, a sounding reference signal using a first antenna of a plurality of antennas configured at the UE;

select the first antenna in order to receive a downlink reference signal from the device, selection of the first antenna based at least in part on the first antenna being used for transmission of the sounding reference signal and on the UE using the downlink reference signal as part of a security key generation procedure for communications between the UE and the device;

receive the downlink reference signal from the device using the first antenna;

deriving, via the security key generation procedure and used a value associated with the downlink reference signal, a security key to be used to secure the communications between the UE and the device; and communicate with the device via the communications between the UE and the device and secured using the security key.

26. The user equipment (UE) of claim 25, wherein the instructions are further executable by the processor to cause the UE to:

receive, from the device, a control message that indicates a configuration for the security key generation procedure, wherein the security key is derived based at least in part on the configuration.

27. The user equipment (UE) of claim 25, further comprising:

determine the value associated with the downlink reference signal by estimating a channel associated with the downlink reference signal.

28. A device for wireless communications, comprising:

a processor;

memory coupled with the processor; and instructions stored in the memory and executable by the processor to cause the device to:

receive, from a user equipment (UE), a sounding reference signal;

estimate a channel between the UE and the device based at least in part on the sounding reference signal and using a set of antennas of a plurality of antennas configured at the device;

select the set of antennas in order to transmit a downlink reference signal to the UE, selection of the set of antennas based at least in part on the set of antennas being used for reception of the sounding reference signal and on the device using the sounding reference signal as part of a security key generation procedure for communications between the UE and the device;

transmit the downlink reference signal to the UE using the set of antennas, the downlink reference signal being generated based at least in part on the estimated channel to produce a target value that is to be used, by the UE, to derive a security key to be used to secure the communications between the UE and the device; and communicate with the UE via the communications between the UE and the device and secured using the security key.

29. The device of claim 28, wherein the instructions are further executable by the processor to cause the device to:

transmit, to the UE, a control message that indicates a configuration for the security key generation procedure, wherein the device communicates with the UE based at least in part on the configuration.

30. The device of claim 28, wherein the instructions are further executable by the processor to cause the device to:

randomly select the set of antennas to use to estimate the channel and to transmit the downlink reference signal.

* * * * *